US012008110B2

(12) United States Patent
Kumar et al.

(10) Patent No.: US 12,008,110 B2
(45) Date of Patent: Jun. 11, 2024

(54) SYSTEM AND METHOD FOR RECORDING DEVICE LIFECYCLE TRANSACTIONS AS VERSIONED BLOCKS IN A BLOCKCHAIN NETWORK USING A TRANSACTION CONNECTOR AND BROKER SERVICE

(71) Applicant: DigiCert, Inc., Lehi, UT (US)

(72) Inventors: Srinivas Kumar, Cupertino, CA (US); Atul Gupta, Sunnyvale, CA (US); Ruslan Ulanov, Dublin, CA (US); Shreya Uchil, Millbrae, CA (US)

(73) Assignee: DigiCert, Inc., Lehi, UT (US)

( * ) Notice: Subject to any disclaimer, the term of this patent is extended or adjusted under 35 U.S.C. 154(b) by 0 days.

(21) Appl. No.: 17/816,206

(22) Filed: Jul. 29, 2022

(65) Prior Publication Data
US 2022/0398322 A1   Dec. 15, 2022

Related U.S. Application Data

(60) Continuation of application No. 16/842,927, filed on Apr. 8, 2020, now Pat. No. 11,403,402, which is a
(Continued)

(51) Int. Cl.
G06F 7/04 (2006.01)
G06F 8/65 (2018.01)
(Continued)

(52) U.S. Cl.
CPC .............. G06F 21/575 (2013.01); G06F 8/65 (2013.01); G06F 9/4401 (2013.01); G06F 9/445 (2013.01);
(Continued)

(58) Field of Classification Search
CPC .... G06F 21/575; G06F 16/27; G06F 16/1834; G06F 8/65; G06F 9/4401; G06F 9/445
See application file for complete search history.

(56) References Cited

U.S. PATENT DOCUMENTS 6,675,296 B1 *   1/2004   Boeyen ................. H04L 9/3263
                                                                 713/175
2001/0032273 A1 * 10/2001  Cheng ..................... H04L 67/12
                                                                 709/249

(Continued)

Primary Examiner — Hang Pan
(74) Attorney, Agent, or Firm — Baratta Law PLLC; Lawrence A. Baratta, Jr.

(57) ABSTRACT

A method of building a device historian, across a supply chain of device manufactures and managers, by a plurality of device management services comprising an enrollment service, an update service, a policy service, and an analytics service, a transaction connector, a blockchain broker service participating as a node in a blockchain network, and transaction filters. The method comprises sending, by the plurality of device management services a transaction record over the transaction connector to the blockchain broker service, receiving, by the blockchain broker service, the transaction record, filtering, by the blockchain broker service, information in the transaction record based on the transaction filters, preparing, by the blockchain broker service, a versioned block based on the filtered information from the transaction record, and adding, by the blockchain broker service, the versioned block to the blockchain network.

18 Claims, 18 Drawing Sheets

Related U.S. Application Data division of application No. 16/180,200, filed on Nov. 5, 2018, now Pat. No. 10,657,261, which is a continuation-in-part of application No. 15/898,950, filed on Feb. 19, 2018, now Pat. No. 10,162,968.

(60) Provisional application No. 62/592,868, filed on Nov. 30, 2017.

(51) Int. Cl.

| | | |
|---|---|---|
| *G06F 9/4401* | (2018.01) | |
| *G06F 9/445* | (2018.01) | |
| *G06F 16/182* | (2019.01) | |
| *G06F 16/27* | (2019.01) | |
| *G06F 21/57* | (2013.01) | |
| *H04L 9/06* | (2006.01) | |
| *H04L 9/08* | (2006.01) | |
| *H04L 9/32* | (2006.01) | |
| *H04L 9/40* | (2022.01) | |
| *H04L 12/66* | (2006.01) | |
| *H04L 41/08* | (2022.01) | |
| *H04L 9/00* | (2022.01) | |

(52) U.S. Cl.
CPC .......... *G06F 16/1834* (2019.01); *G06F 16/27* (2019.01); *H04L 9/0643* (2013.01); *H04L 9/0825* (2013.01); *H04L 9/0877* (2013.01); *H04L 9/0891* (2013.01); *H04L 9/3239* (2013.01); *H04L 9/3247* (2013.01); *H04L 9/3263* (2013.01); *H04L 9/3297* (2013.01); *H04L 12/66* (2013.01); *H04L 41/08* (2013.01); *H04L 63/0823* (2013.01); *H04L 63/12* (2013.01); *H04L 9/50* (2022.05)

(56) References Cited

U.S. PATENT DOCUMENTS

| | | | | |
|---|---|---|---|---|
| 2005/0114653 | A1* | 5/2005 | Sudia | H04L 9/3263 713/158 |
| 2011/0029771 | A1* | 2/2011 | Mehta | H04L 9/3265 713/156 |
| 2012/0254054 | A1* | 10/2012 | Meltzer | G06Q 10/10 705/321 |
| 2015/0043377 | A1* | 2/2015 | Cholas | H04W 48/08 370/254 |
| 2015/0326563 | A1* | 11/2015 | Chan | H04L 63/0823 713/172 |
| 2017/0132626 | A1* | 5/2017 | Kennedy | G06Q 20/065 |
| 2018/0137457 | A1* | 5/2018 | Sachs | G06Q 20/308 |

\* cited by examiner

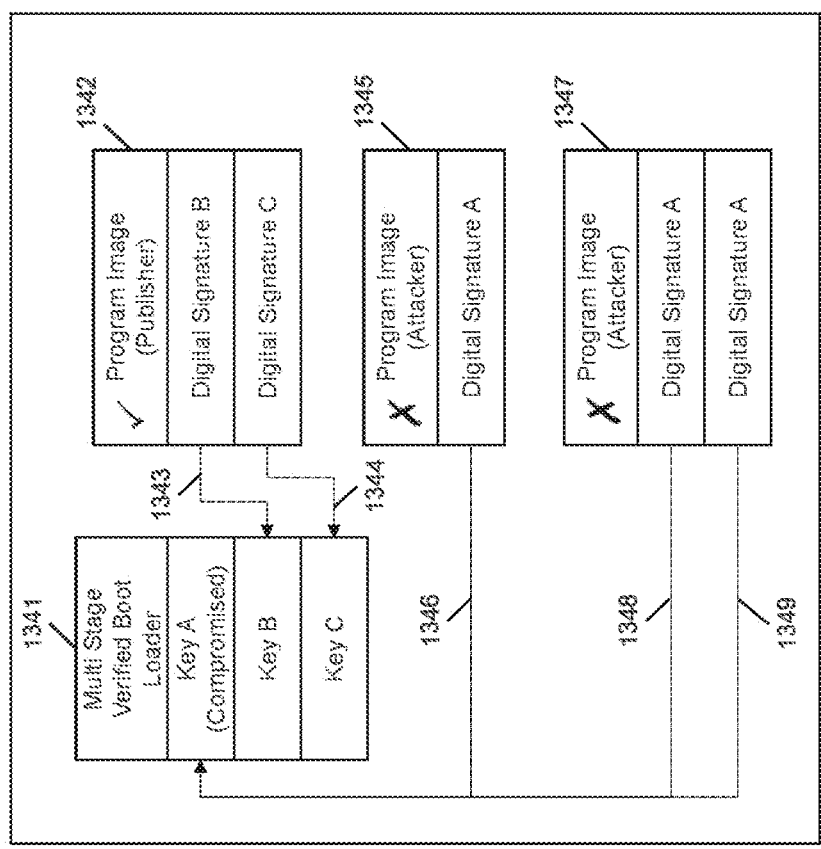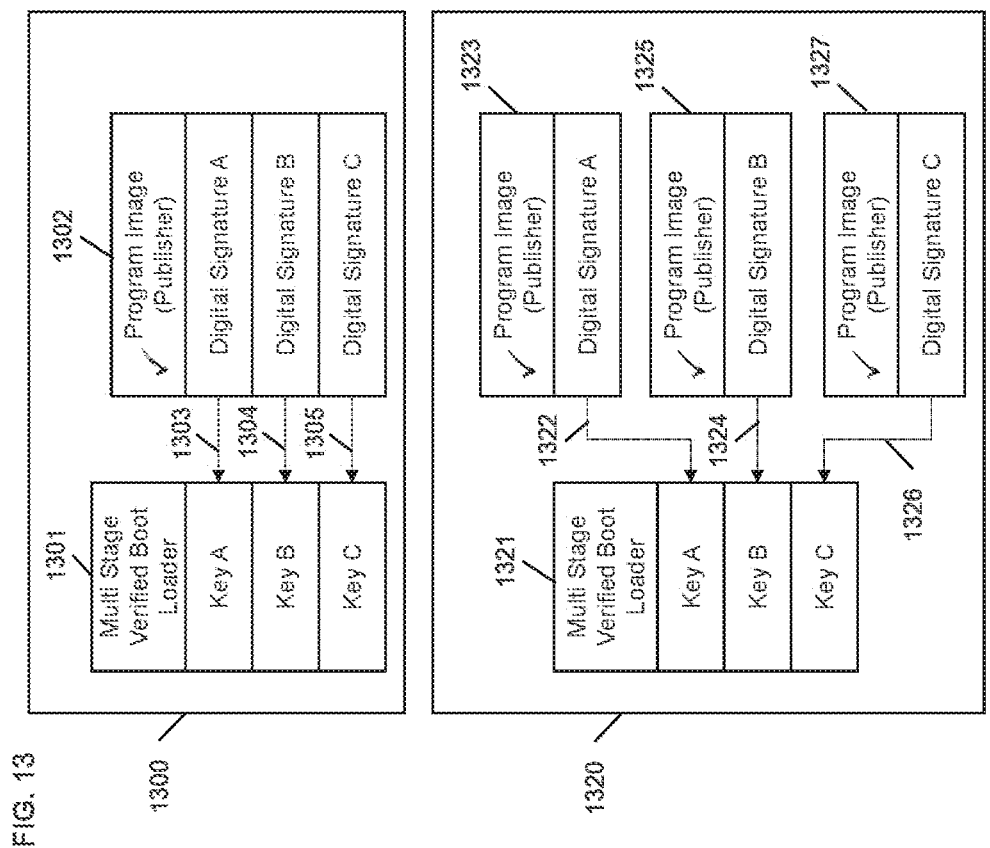
FIG. 13

SYSTEM AND METHOD FOR RECORDING DEVICE LIFECYCLE TRANSACTIONS AS VERSIONED BLOCKS IN A BLOCKCHAIN NETWORK USING A TRANSACTION CONNECTOR AND BROKER SERVICE

RELATED MATTERS

This application is a continuation of U.S. patent application Ser. No. 16/842,927, filed on Apr. 8, 2020, which is a divisional of U.S. CIP patent application Ser. No. 16/180,200, filed on Nov. 5, 2018, which is a continuation-in-part of U.S. patent application Ser. No. 15/898,950, filed on Feb. 19, 2018, which the claims the benefit of U.S. Provisional Application, 62/592,868, filed on Nov. 30, 2017, each of which is herein incorporated by reference.

FIELD

This disclosure relates to the field of device protection for the Internet of Things (IoT) based on the issuance of cryptographically signed artifacts by an enrollment service and a certificate authority based on identity proofing, and the use of the issued artifacts by device management services.

BACKGROUND

Cybersecurity poses a serious risk in the emerging field of Operation Technology (OT) to IoT devices deployed ubiquitously across the industrial, automotive and home automation sectors of industry. Tamper resistant devices across the supply chain require certificate based enrollment. Update services require high assurance cryptographic signatures for secure delivery of updates over the air or over the network to remote devices. Zero Touch Provisioning (e.g., the ability to configure a device without user interaction, typically during device installation) is required for device registration and device management services. Current approaches for device registration include manual provisioning using web portals using a user generated digital hash (digest) of an endorsement key or a certificate (X.509), or use of a service provider proprietary JSON Web Token (JWT) based on assigned device identifiers. Automation is achieved using scripts for batch processing for scalability of the operation. An alternate emerging approach is the use of private/per-missioned Blockchain technology to enroll participants based on decentralized authentication and use of public key infrastructure (PKI) for cryptographic signatures. Alternate methods based on the use of Blockchain provide strong protections against data tampering, decentralized control for scalability, and public key cryptography and digital signatures to protect ownership of digital assets and transactions.

Limitations of such methods include inadequate proof possession of non-real-life identity, insecure identity proofing methods, proprietary methods for certificate management that are not protocol based, vendor lock-in, and only address the device enrollment use case, after which applications must deal with secure keys/storage and certificate management, that makes applications vulnerable. Other approaches provide signature-based secure change of ownership through the supply chain using group membership based key pairs. However, this requires a centralized broker in the workflow outside the information technology (IT) and OT domain of operation. Blockchain-based approaches lack non-repudiable device identity in communications; device enrollment lacks authoritative proof of identity, and lacks scalability at high volume of concurrent transactions.

Blockchain technology provides a method of decentralized control for scalability, data signing and signature verification, based on public key cryptography and digital signatures to protect ownership of digital assets and transactions. However, there may be no non-repudiable device identity in communications, the IoT device registration may be performed without authoritative proof of identity, and IoT devices may lack the required computational power to encrypt and decrypt data. Blockchain applications submit transaction requests to the network. A peer on the network processes the transaction request using a smart contract (codechain), updates a ledger, and emits a block of transactions for integration between systems.

Current approaches use various methods for device discovery, identification and registration. These methods either require user intervention on headless devices (i.e., devices that operate without an interactive user) or require administrative actions to pre-register a device prior to authoritative discovery and identification for registration. Some such methods include (a) discovery based on a network (IP) address and personalities (e.g., well known service ports, application protocol specific query inspection, etc.); (b) device pre-registration to apply enrollment rules by device type; (c) discovery of headless device using shared secrets; (d) enrollment policies by type of device; (e) trusted association between the appliance and a certificate authority wherein the issued certificate is associated with a communications address of the device; (f) use of a preexisting cryptographic key pair; (g) trust relationship between inside and outside endpoints and an intermediate assisting gateway device, wherein a device password or pre-registration of the device in a configuration database is required; (h) identifying by a service a network device using a unique identifier of the device; (i) identifying a first device connected to the network using a second user device, further wherein the first device acquires its IP over DHCP; (j) use of a HSM by an asset management system to create a secure endpoint between controller and appliances; and (k) use of a network connected assisting device to connect to another device by device identifier, which requires a preexisting certificate or token for another device.

Technologies that are based on the need for privacy protection and anonymity, such as for example the Intel® Enhanced Privacy ID (EPID) scheme, use a group public key and member unique private key for a member to prove to a verifier that it is a trusted member of a group without disclosing the identity of the member. However, such methods are limited to verification of message integrity in data exchanges and require a centralized issuer to create groups and manage memberships. While the EPID signature facilitates in an attestation based transfer of ownership from a silicon vendor to an IoT service provider, device lifecycle management requires administration, operation and maintenance based on device certificates and PKI for data confidentiality.

Other approaches based on blockchain provide for signing keys to protect data-at-rest, data signing, and signature verification between a client and server using a centralized broker and Representational State Transfer (REST) APIs to sign and verify data hashes. Such use of keyless signatures without relying on PKI or certificates is limited to message signing for data integrity. The signature scheme on the server requires periodic (monthly) renewal.

Alternate approaches based on use of a unique digital fingerprint of the device based on immutable hardware configuration, and algorithm processing that requires at least one user configurable parameter for filler code, is not a viable solution for headless devices or scalability across millions of distributed IoT devices. Using a private key based on the digital fingerprint of the device, and including the digital fingerprint of the device in the issued public certificate for the device, defeats privacy and anonymity protections, and exposes the device to reverse engineering and hacker attacks.

SUMMARY

In sharp contrast to the above-mentioned methods, the system for device enrollment of the present disclosure does not require: (a) device pre-registration prior to device discovery and identification; (b) use of shared secrets; (c) pre-issued certificate for the device by a certificate authority; (d) inferred trust relationship with a user device; (e) connectivity of the inside endpoint to a TCP/IP network; or (f) use of a preexisting cryptographic key issued for the device, though a pre-shared secret may be optionally used to provide advanced proof of possession of identity. The disclosed methods of the disclosed system can, depending on implementation: (a) provide distributed control without requiring a centralized issuer for group and member key management; (b) require no centralized broker in adherence with the blockchain notion of decentralized control and PKI based strong protection for digital assets and transactions against data tampering; (c) provide for zero-touch provisioning with no user configurable parameter required to register a headless device; and (d) offer privacy protection with no requirement to include a device fingerprint in the device certificate. The endpoint device only requires an immutable device identifier that does not require preregistration with any enrollment service prior to discovery, and an associated gateway device (for non-IP endpoint devices only) with a local or remote secure element to serve as the root of trust anchor.

In an exemplary embodiment, the method of the disclosed system differentiates device enrollment and device registration as distinct workflows. Device enrollment is the first assignment of a device credential based on identity proofing of the device by a secure element that serves as the root of trust for the device. Device enrollment is required to add (or join) a device to a permissioned domain and blockchain. Device registration is the addition of an enrolled device (i.e., a post enrollment step) to a connected service such as, for example, a device management service, a policy service, or an update service. Device registration is required for onboarding a device into a managed network, for assignment or transfer of device ownership to a device management service, for policy based remote operations, administration, maintenance and provisioning functions. A device enrollment request may include device enrollment and device registration (for certificate-based enrollment) as an integrated workflow action. Similarly, a device disenrollment request may include device disenrollment and device deregistration (for certificate based enrollment) as an integrated workflow action.

Traditional IT threat models use a multi-layer defense mindset that pivots on threat intelligence, grammar, expressions and anomaly detection based on deviation from baseline. IoT requires a paradigm shift from detection to protection, with a pivot on the safety of systems. This requires anticipation of risks, preemptive countermeasures and application resiliency to exploits with embedded safety controls.

Data transport over a Local Area Network (LAN) or Wide Area Network (WAN) requires an Internet Protocol (IP) address assigned statically or dynamically by a network service. Legacy brownfield devices use point-to-point interfaces and link protocols (e.g., RS-232, RS-422, RS-485, Highway Addressable Remote Transducer (HART), Modbus, Controller Area Network (CAN) Bus, Aeronautical Radio (ARINC), General Purpose Input Output (GPIO)) and may not have an IP protocol stack for networking.

The disclosed method can provide significant improvements and efficiencies to retrofit legacy devices for protection and remote device management. Non-IP address assigned devices (hereinafter "non-IP devices") with resource constraints (e.g., memory, battery powered, etc.) and point-to-point connectivity, that are not accessible over IP networks, may be discovered for device enrollment and management. Non-IP devices, that do not have a network IP address, may be associated to a connected IP gateway device and vice versa for identification and certificate based management. Data transfer from/to non-IP devices, including device configuration, firmware or application software updates, may be proxied by a connected IP gateway device over IP (LAN or WAN) networks using device associated certificates for confidentiality and integrity. Dynamic association of non-IP devices to connected gateway devices may be monitored by a device management service. Connected endpoint and gateway devices may participate as blockchain applications to initiate non-IP or IP device discovery and associate authenticated transactions with network peers in the blockchain, based on orchestration rules (i.e., smart contract or codechains), and generate transaction records in distributed ledgers for device inventory and status management over the lifecycle of a device.

The disclosed method can provide significant process improvements and efficiencies for scalability with (a) automated registration of IP and non-IP devices during certificate based enrollment with configured policy services for device on-boarding; (b) automated deregistration of IP and non-IP devices during certificate revocation with configured policy services for device off-boarding; (c) policy based dynamic association (connector) with a plurality of certificate authorities for certificate issuance and revocation, wherein the connector's attributes may include at least the certificate cost and term; and (d) authentication of endpoint and connected gateway devices at the enrollment service to establish a multi-system trust chain, wherein the certificate request for the connected endpoint device is signed using the gateway device certificate, and further wherein the gateway device certificate is signed using an endorsement certificate of a underlying local secure element (root of trust) on the gateway device.

Any form of update to in-field devices based on commonly used secure transport protocols, such as for example Transport Layer Security (TLS) or Internet Protocol Security (IPsec), only provide in-transit data confidentiality by validation of the sender (server) and optionally the receiver (client) in peer-to-peer communications. There is no verification of supply chain integrity. Updates delivered to devices, such as firmware updates, configuration updates, firewall rules, software updates, operating system patches, etc. traverse from the provider, through distributors to the publishers. This flow path includes multiple hops of store and forward silos. There is no provision in such delivery mechanisms for high assurance of tamper resistant packaging of the update package across the supply chain. The disclosed method describes a scalable and automated approach to incorporate supply chain provenance for end-to-end data confidentiality and integrity based on use of innovative cryptographic techniques and authoritative identity proofing of all entities in the distribution chain.

The disclosed method for device identification for enrollment and registration, and secure updates is applicable to non-IP and IP endpoint devices and IP gateway devices. In industry parlance, endpoint devices may also be referred to as edge devices or sensors, and gateway devices may also be referred to as core devices.

An exemplary embodiment of the present disclosure provides a method of device identification for enrollment and registration of an endpoint device that is connected to a gateway device. The method uses a multi-stage verified boot loader, a discovery agent at the endpoint device, a discovery service at the gateway device, an enrollment service, a policy service, and a device management service. The method includes: sending, by the discovery agent on the endpoint device, to the discovery service on the gateway device, an authenticated identity beacon with an endpoint device profile. The method includes verifying, by the discovery service, authentication of the endpoint device and the endpoint device profile; and generating, by the discovery service, a certificate request for the endpoint device from a privacy certificate authority. The method includes sending, by the discovery service, the certificate request for the endpoint device to the enrollment service. The method includes processing, by the enrollment service, the certificate request for the endpoint device that is received to translate the certificate request for a certificate authority; and sending, by the enrollment service to the certificate authority, the translated certificate request for the endpoint device. The method includes receiving, by the enrollment service, a certificate for the endpoint device issued by the certificate authority; and processing, by the enrollment service, the received certificate for the endpoint device to translate the received certificate for the endpoint device to represent a privacy certificate authority. The method includes sending, by the enrollment service, the certificate for the endpoint device to the discovery service; and sending, by the enrollment service, a notification of endpoint device registration to the policy service. The method includes sending, by the policy service, a directive to add the endpoint device to a device management service; and storing, by the discovery service, the issued endpoint device certificate in a local certificate store.

An exemplary embodiment of the present disclosure provides a method of deregistering a device using an administration dashboard, an enrollment service, a policy service, and a device management service. The method includes initiating, from the administration dashboard by an authenticated and privileged user, an action to revoke a device certificate; and sending, by the enrollment service, a revocation command to a certificate authority. The method includes sending, by the enrollment service, a notification of device certificate revocation to the policy service. The method includes sending, by the policy service, to the device management service, a directive to remove the device.

An exemplary embodiment of the present disclosure provides a method of endpoint device enrollment using a discovery service on a gateway device as a blockchain application and an enrollment service in the network as a blockchain network peer. The method includes sending, by the discovery service, an enrollment request for the endpoint device to the enrollment service in a network. The method can include receiving, by the enrollment service, the enrollment request and authenticating the gateway device. The method includes generating, by the enrollment service, a certificate issued by a certificate authority for the endpoint device based on orchestration rules established for a network service of the network. The method includes sending, by the enrollment service, the certificate for the endpoint device to the gateway device. The method includes recording, by an update service, a request log for the endpoint device as a transaction record in the local ledger, and distributing blocks of transaction records to blockchain peers to maintain a distributed ledger to reproduce device history.

An exemplary embodiment of the present disclosure provides a method of updating a registered device using a development system and a release management system operated by an update provider, an update service operated by an update publisher, an update client on the device, and a local secure element on the device. The method includes building, on the development system, an update package including at least one of a firmware update, a software update, a configuration update, and an update script. The method includes signing, by the release management system, the update package using a provider signing key, wherein a first digital signature is included in the update package. The method includes encrypting, by the release management system, the signed update package using a publisher public key from a publisher certificate for the update publisher for initial encryption of the update package. The method includes sending, by the release management system, the signed and encrypted update package to the update service. The method includes requesting, by the update client on the device, an update package. The request can include a device manifest and at least the vendor identifier, the model number, and a device certificate for the device. The method includes preparing, by the update service, based on the received device manifest a set of signed update packages for the device based on the configured orchestration rules for the device. The method includes reencrypting and resigning, by the update service, the signed update package by decrypting the initial encryption using a publisher private key of the update publisher, signing the update package using a signing key of the update publisher, and finally encrypting the update package using a device public key from the device certificate, for final encryption of the update package. A second digital signature is included in the update package. The method includes sending, by the update service, the encrypted and doubly signed update package to the update client on the device. The method includes decrypting, by the update client, the encrypted update package using a device private key for the device. The method includes verifying, by the update client, the first and second digital signatures using the respective public keys from the update provider and publisher certificates issued by a certificate authority. In an exemplary embodiment, the update script is executed on the device to apply the update package to the device.

An exemplary embodiment of the present disclosure provides a method of updating a device using an update client on the device as a blockchain application, an update service in a network as a blockchain network peer, orchestration rules, and a ledger. The method includes sending, by the update client, a device request for an update package for the device from the update service in the network. The method includes receiving, by the update service, the device request and authenticating the device. The method includes preparing, by the update service, a signed and encrypted update package based on the orchestration rules established for a network service of the network. The method includes sending, by the update service, the signed and encrypted update package to the device. The method includes recording, by the update service, a request log for the device as an entry in the ledger, and distributing blocks of transaction records to blockchain peers to maintain a distributed ledger to reproduce history of the device.

An exemplary embodiment of the present disclosure provides a method of securing data transport between an endpoint device, that does not have an IP address, and a gateway device that is connected to the endpoint device using a discovery agent, a discovery service, an enrollment service, a policy service, and a device management service. The method includes sending, by the discovery agent on the endpoint device, to the discovery service on the gateway device, an authenticated identity beacon with a device profile of the endpoint device. The method includes verifying, by the discovery service, authentication of the endpoint device and the device profile; and generating, by the discovery service, a certificate request for the endpoint device from a privacy certificate authority to the enrollment service. The method includes processing, by the enrollment service, the certificate request for the endpoint device that is received to translate the certificate request for a certificate authority. The method includes sending, by the enrollment service to the certificate authority, a certificate request for the endpoint device; and receiving, by the enrollment service, a certificate for the endpoint device issued by the certificate authority. The method includes processing, by the enrollment service, the received certificate for the endpoint device to translate the received certificate for the endpoint device to represent a privacy certificate authority. The method includes sending, by the enrollment service, to the discovery service, the certificate for the endpoint device. The method includes sending, by the enrollment service, a notification of endpoint device registration to a policy service; and sending, by the policy service, to a device management service a directive to add the endpoint device. The method includes storing, by the discovery service, an issued endpoint device certificate in a local certificate store of the gateway device. The method includes receiving, by an application on the gateway device, data in transit from/to the endpoint device and performing cryptographic operations on the data using the certificate for the endpoint device from the local certificate store, for secure data transport.

BRIEF DESCRIPTION OF THE DRAWINGS

The disclosure is best understood from the following detailed description when read in connection with the accompanying drawings. According to common practice, various features/elements of the drawings may not be drawn to scale. Common numerical references represent like features/elements. The following figures are included in the drawings:

FIG. 13 is schematic diagram illustrating program image verification by a multi-stage verified boot method and protection countermeasures against abuse of compromised private signing keys by an attacker in accordance with various exemplary embodiments of the disclosed system.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Although the disclosure is illustrated and described herein with reference to specific embodiments, the disclosure is not intended to be limited to the details shown herein. Rather, various modifications may be made in the details within the scope and range of equivalents of the claims and without departing from the scope of the disclosure.

A Certificate Authority (CA), for example a commercial CA, refers to a certificate service provider that issues certificates (such as, for example, a certificate based on the X.509 standard). A privacy CA refers to a certificate service provider that participates in the identity proofing methods supported by secure elements (such as, for example, a Trusted Platform Module (TPM) based on the Trusted Computing Group (TCG) specifications, a network or cloud based Hardware Security Module (HSM) for device authentication based on a manufacturer issued endorsement key, or a device authentication artifact such as a Physically Unclonable Function (PUF) generated device unique identifier.

A device unique identifier may be an immutable static identifier or regenerated dynamically at power-on using a PUF engine on the device. In legacy devices, a digital fingerprint may comprise of a cryptographic signature based on device properties and attributes such as a programmatically readable device serial number, a One Time Programmable (OTP) hash of a private key in boot ROM, or hardware register(s) based unique digital values.

In an exemplary embodiment of the disclosed system, the gateway enrollment with the device management service may be performed using a gateway unique identifier, wherein the endorsement certificate of a secure element may be used to digitally sign the gateway certificate request. The issued gateway certificate may subsequently be used to digitally sign a certificate request for the connected device using the device unique identifier.

In yet another exemplary embodiment of the disclosed system, the issued gateway certificate may subsequently be used to digitally sign a certificate request for an application or service installed and executing at the gateway using an application or service principle name as the unique identifier.

Figure 1:
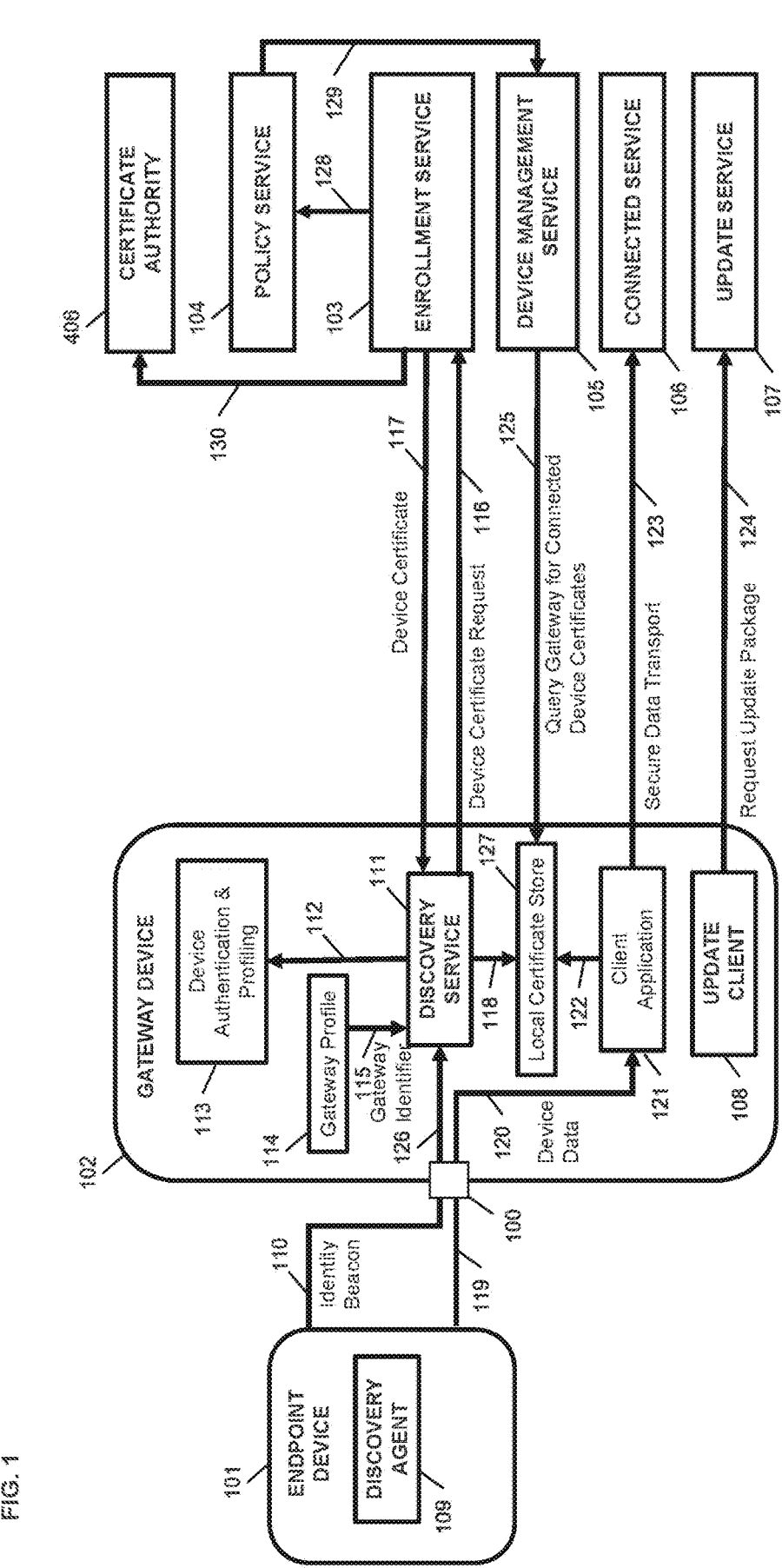
FIG. 1 is a graphical representation of a device lifecycle management system for endpoint and gateway devices, in accordance with various exemplary embodiments of the disclosed system.
Figure 2:
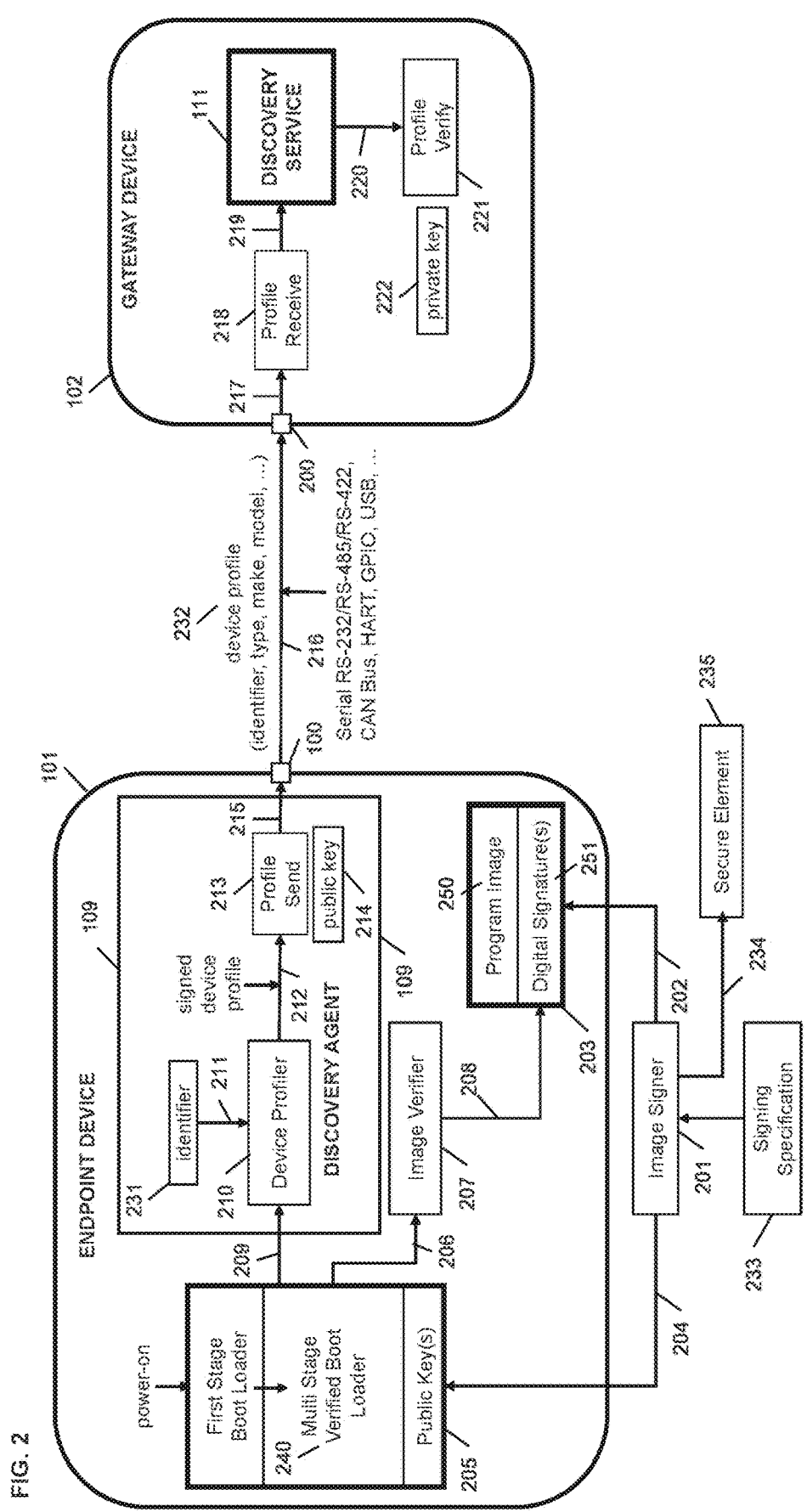
FIG. 2 is a schematic diagram illustrating a method to discover non-IP endpoint devices physically connected to a connected IP gateway device in accordance with various exemplary embodiments of the disclosed system.

Referring to FIG. 1 and FIG. 2, the discovery agent 109 on the non-IP endpoint device 101 at power-on and optionally at a configured periodic interval sends an identity beacon 110 over a communications interface 100 to a discovery service 111 on the connected IP gateway device 102. The communications interface 100 may be a serial, parallel, bus, USB interface, etc. At step 126, the discovery service 111 receives the identity beacon 110 via an appropriate interface driver on the gateway device 102. At step 112, the discovery service 111 performs device authentication and profiling 113 to verify the integrity of the identity beacon 110 and device profile 232 including at least the endpoint device identifier 231. At step 115, the discovery service retrieves an immutable identifier for the gateway device 102 from the gateway profile 114 that includes at least the gateway identifier 115, type, make and model of the gateway device. At step 116, the discovery service 111 builds and sends a certificate request 116 for the endpoint device 101 that includes at least the endpoint device profile 232 and the gateway device profile 114, to the enrollment service 103. At step 117, the enrollment service 103 responds with a certificate issued by a certificate authority for the endpoint device 101 with the endpoint device profile 232 and connected gateway profile 114 as extended attributes. At step 118, the issued certificate for the connected endpoint device 101 is stored in the local certificate store 127.

Referring to FIG. 1, at step 119 the non-IP endpoint device 101 initiates a data exchange with a connected service 106 via the communications interface 100 on the connected IP gateway device 102. At step 120, the device data 120 is received by a client application 121 that serves as a proxy service to forward data exchanges between the endpoint device 101 and the connected service 106. At step 122, the certificate associated with the connected endpoint device 101 is retrieved by the client application 121 from the local certificate store 127. The retrieved certificate may be used at step 123 for mutual authentication to establish secure communications with a connected service 106, or at step 124 to request an update package from an update service 107 for secure update.

Referring to FIG. 1 and FIG. 2, at step 124, the update client 108 on the gateway device 102 requests an update package from the configured update service 107. The update package request includes the device certificate, for either the connected endpoint device 101 or the gateway device 102, and associated device profile 114, 232 that includes at least the identifier, type, make and model of the device.

Referring to FIG. 1, at step 125 the device management service 105 queries the gateway device 102 for certificates issued to connected non-IP endpoint devices.

Referring to FIG. 1 and FIG. 2, at step 128 the enrollment service 103 sends a notification of endpoint device registration to the policy service 104. At step 129, the policy service 104 sends a directive to add the endpoint device 101 to the device management service 105. At step 130, the enrollment service 103 sends a certificate request for the endpoint device 101 to the certificate authority 406; processes the received certificate for the endpoint device 101 to translate the received certificate (received by the enrollment service 103 from the certificate authority 406) to represent a privacy certificate authority; and sends the certificate for the endpoint device 101 to the discovery service 111. A secure element 235 (e.g., a TPM, etc.) may support advanced proof of possession of an identity (i.e., a secret) that must be utilized by a privacy CA to encrypt the issued certificate, for example, by using the public key of the secure element 235 which may only be decrypted using the corresponding private key. Alternate methods may include using a symmetric key generated using a key derivation function and a protected seed. Therefore, unless the secure element 235 on the endpoint device 101 is truly in possession of the secret, the certificate cannot be decrypted by the secure element 235. Commercial CA's 406 may not support such a mechanism. Therefore, a translation can be performed at the enrollment service 103 to serve as a proxy service between the discovery service 111 and the commercial CA 406. The commercial CA 406 issues the certificate and the enrollment service 103 prepares a response message with contents that include the issued certificate encrypted to support advanced proof of possession of identity.

Referring to FIG. 2, at step 202 the image signer 201, based on a signing specification 233, generates a public-private asymmetric key pair to digitally sign the program image 250 to generate the signed program image 203. At step 204, the public key associated with the generated key pair is included in a multi-stage verified boot loader 240. At power-on of the endpoint device 101, at block 205, the first stage boot loader executes and transfer control to the next stage multi-stage verified boot loader 240. At step 209, the multi-stage verified boot loader 240 invokes the device profiler 210. At step 211, an endpoint device identifier is generated by the device profiler 210 based on a plurality of indicators on the endpoint device 101 such as, for example, an endpoint address on a data bus or a one-time programmable serial number in non-volatile storage on the endpoint device 101. At step 212, a device profile 232 that includes at least the identifier, type, make and model of the endpoint device 101 is signed using the public key 214 of an asymmetric key pair by the profile send function 213. At step 216, the signed device profile 232 is transmitted over the communications interface 100 to the connected gateway IP device 102 over a communications link such as, for example, a serial RS-232, RS-485, RS-422, CAN Bus, Modbus, HART, GPIO, Universal Serial Bus (USB) interface, etc.

Referring to FIG. 2, at step 206, the image verifier 207 is executed by the multi-stage verified boot loader 240. At step 208, the image verifier 207 regenerates and verifies the digital signature of the signed program image 203. Based on successful verification, the signed program image is loaded into memory and executed.

Referring to FIG. 2 and FIG. 1, at step 217, the signed device profile 232 is received as an identity beacon 110 over physical interface 200 on the gateway device 102. At step 219, the device profile 232 is processed by the profile receive function 218. At step 220, the discovery service 111 uses the profile verify function 221 to verify the integrity of the signed device profile 232 using the associated private key 222. The discovery service 111 associates the device profile 232 for the endpoint device 101 connected to the physical communications interface 200.

In one exemplary embodiment of the disclosed system, referring to FIG. 2 at step 234 the image signer 201 uses a secure element 235 such as, for example, a trusted platform module (TPM), network hardware security module (HSM), cloud HSM, etc. to generate the signing key pair, wherein the private signing key is protected within the secure element 235.

In one exemplary embodiment of the disclosed system, the multi-stage verified boot loader 240 may use multiple public keys and the image signer 201 may use multiple equivalent signing keys to generate multiple digital signatures using the signing specification 233 for the signed program image 203. This method protects the endpoint device 101 (or gateway device 102) from lost and/or stolen private keys by requiring multiple signing keys to be compromised, providing a countermeasure for rapid mitigation. The use of the multiple signing keys may be implemented as a logical 'AND' operation for enhanced protection against signed program image 203 in-field updates signed using a compromised signing key, or as a logical 'OR' operation for redundancy and high availability of mission critical systems. In the absence of certificate-based validation of public keys, the logical 'AND' and 'OR' operations on multiple key pairs provides effective countermeasures to block verification based on compromised keys. Compromise of an issued PKI public key may be engineered using techniques such as, for example, a published vulnerability described as the Return of the Coppersmith Attack (ROCA).

In yet another exemplary embodiment of the disclosed system, the signing specification 233 for the multi-stage verified boot 240 may require verification of only, and at least two of, the digital signatures present in a signed program image 203 with a loose placement order, and use of different signing specifications for each key pair for uniqueness. This method enables the publisher of the signed program image 203 to update the device without use of a compromised public key on the device until the compromised public key embedded with the multi-stage verified boot loader 240 is replaced (i.e., key renewal).

In yet another exemplary embodiment of the disclosed system, the signing specification 233 for the multi-stage verified boot loader 240 may require an ordered list of digital signatures for the signed program image 203 to match a strict placement order of the public keys in the multi-stage verified boot loader 240 and use of different signing specifications for each key pair for uniqueness, for protection against potential abuse with just one compromised public-private key pair. Impersonation of a signed program image 203 update using the compromised signing key is protected by such a countermeasure requiring use of the logical 'AND' operation and a strict placement order by the signing specification 233.

The signed program image 250 to be verified at block 203 may be a first stage boot loader, a next stage (e.g., secondary, etc.) boot loader or an operating system (OS) loader on the device. The multi-stage verified boot loader 240 at block 205 may be injected at any stage of the boot sequence, beginning as early as a boot ROM on the device that may verify and load the OS. The multi-stage verified boot loader 240 may be injected into a boot sequence (or chain) to forward verify a plurality of subsequent stage boot loaders, images, configuration and data files without requiring any modification to the subsequent stage boot loaders.

Figure 3:
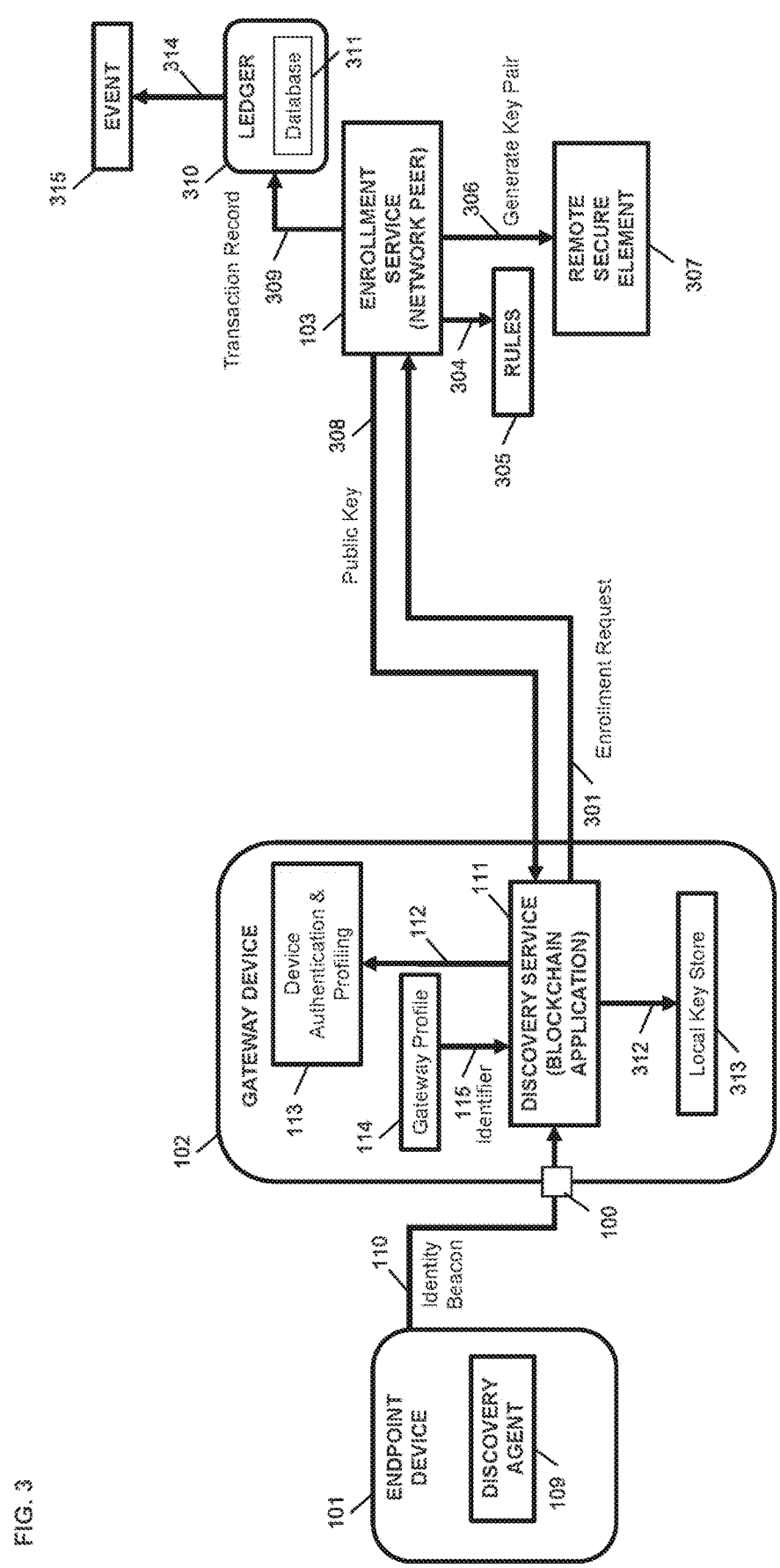
FIG. 3 is a schematic diagram illustrating a non-IP endpoint or IP gateway device enrollment using a remote secure element in accordance with various exemplary embodiments of the disclosed system.
Figure 4:
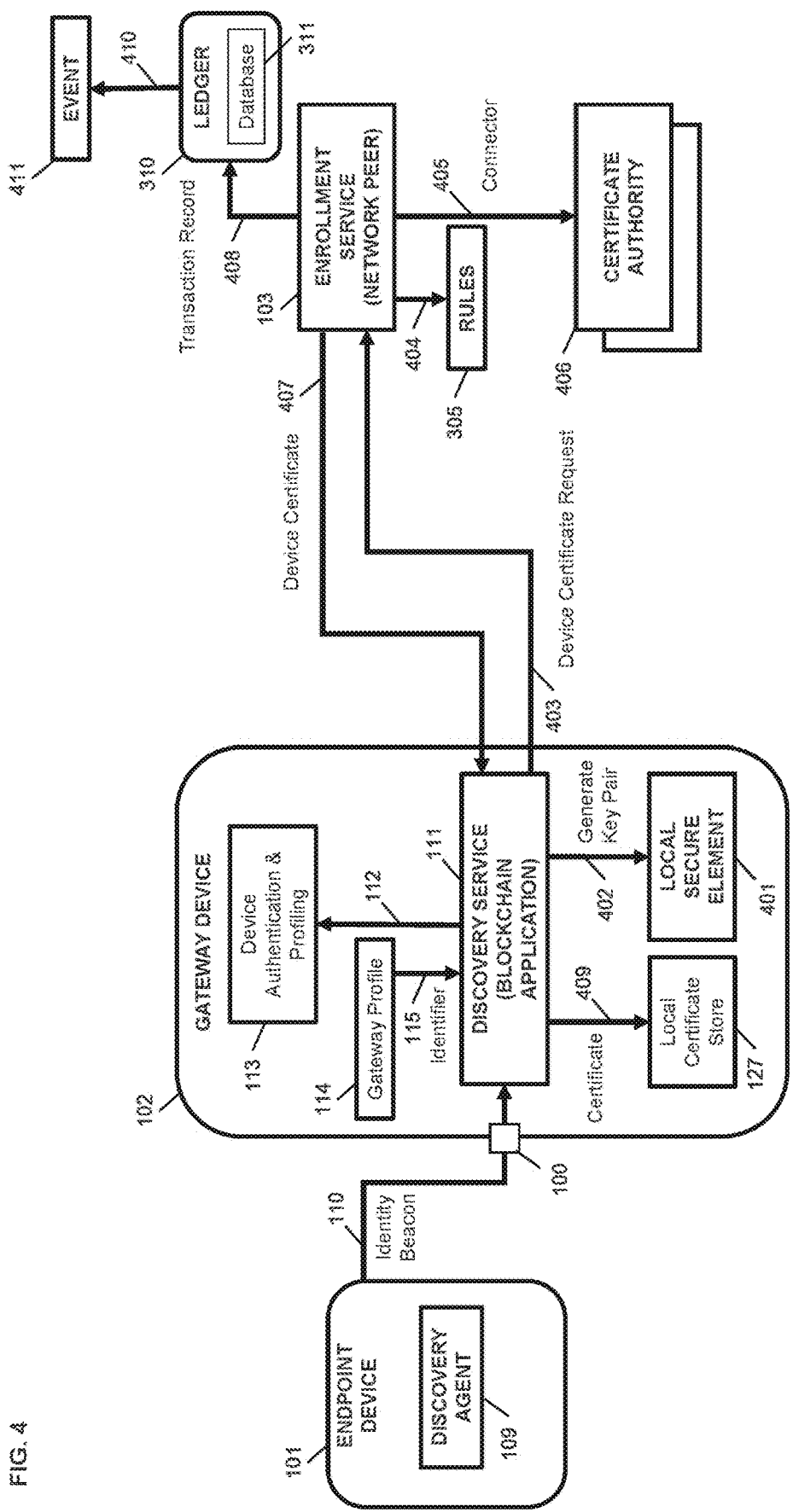
FIG. 4 is a schematic diagram illustrating a non-IP endpoint or IP gateway device enrollment using a local secure element and certificate authorities in accordance with various exemplary embodiments of the disclosed system.

Referring to FIG. 3, FIG. 1 and FIG. 2, at step 301, the discovery service 111 on the gateway device 102 sends an enrollment request for the endpoint device 101 over secure transport, with enrollment service 103 one-way certificate verification including the endpoint device profile 232 and the gateway device profile 114 to the enrollment service 103. At step 304, the enrollment service 103 performs gateway device 102 and endpoint device 101 authentication, and enrollment request validation based on the configured orchestration rules 305. The device authentication may be performed using X.509 certificates or JWT based methods. At step 306, the enrollment service 103 generates a PKI public-private key pair using a remote secure element 307. At step 308, the generated public key associated with the endpoint device 101 is sent to the discovery service 111 over secure transport. The private key associated with the endpoint device 101 is stored securely within the remote secure element 307. At step 312, the public key associated with the endpoint device 101 is stored in the local key store 313 for encryption or signing by the endpoint device 101, or for secure update of the endpoint device 101 at step 123.

In one exemplary embodiment of the disclosed system, a network or cloud based HSM may be configured as the remote secure element 307.

In another exemplary embodiment of the disclosed system, at step 309 a transaction record of the device enrollment may be added by the enrollment service 103 to a local ledger 310 that includes a database function 311. At step 314, the local ledger 310 emits an event 315 that represents a block of device enrollment transactions for integration with applications in a blockchain.

In yet another exemplary embodiment of the disclosed system, at step 301 the enrollment request may be for the gateway device 102. At step 312, the public key associated with the gateway device 102 is stored in the local key store 313 for encryption or signing by the gateway device 102, or for secure update of the gateway device 102.

Referring to FIG. 4, FIG. 1, FIG. 2, and FIG. 3 at step 402 the discovery service 111 at step 402 generates a PKI asymmetric key pair using a local secure element 401 to protect the private key of the key pair. At step 403, the discovery service 111 sends a certificate signing request (CSR) for the device that includes the endpoint device profile 232 and the gateway device profile 114. The CSR may include an endorsement public key or certificate of the local secure element 401 as proof of possession of the private key to decrypt a certificate encrypted by a certificate authority 406 using the endorsement public key. At step 404, the enrollment service 103 performs gateway device 102 and endpoint device 101 authentication, and enrollment request validation based on the configured orchestration rules 305. At step 405, the enrollment service 103 uses a connector to request one of a plurality of certificate authorities 406 for a certificate for the device, based on the configured connector attributes, for example, the cost, certificate type, certificate provider, etc. At step 407, the certificate authority (CA) issued endpoint device certificate, which may include at least the endpoint device profile 232 and connected gateway device profile 114 as extended attributes, is sent from the enrollment service 103 to the discovery service 111 in the gateway device 102. At step 409, the discovery service 111 stores the received endpoint device certificate in the local certificate store 127 to provide secure data transport (at step 123) and to request an update package (at step 124) for the endpoint device 101.

In another exemplary embodiment of the disclosed system, at step 408 a transaction record of the device enrollment may be added by the enrollment service 103 to a local ledger 310 that includes a database 311 that performs a database function. At step 410, the ledger 310 emits an event 411 that represents a block of device enrollment and registration transactions for integration with applications in a blockchain.

Figure 5:
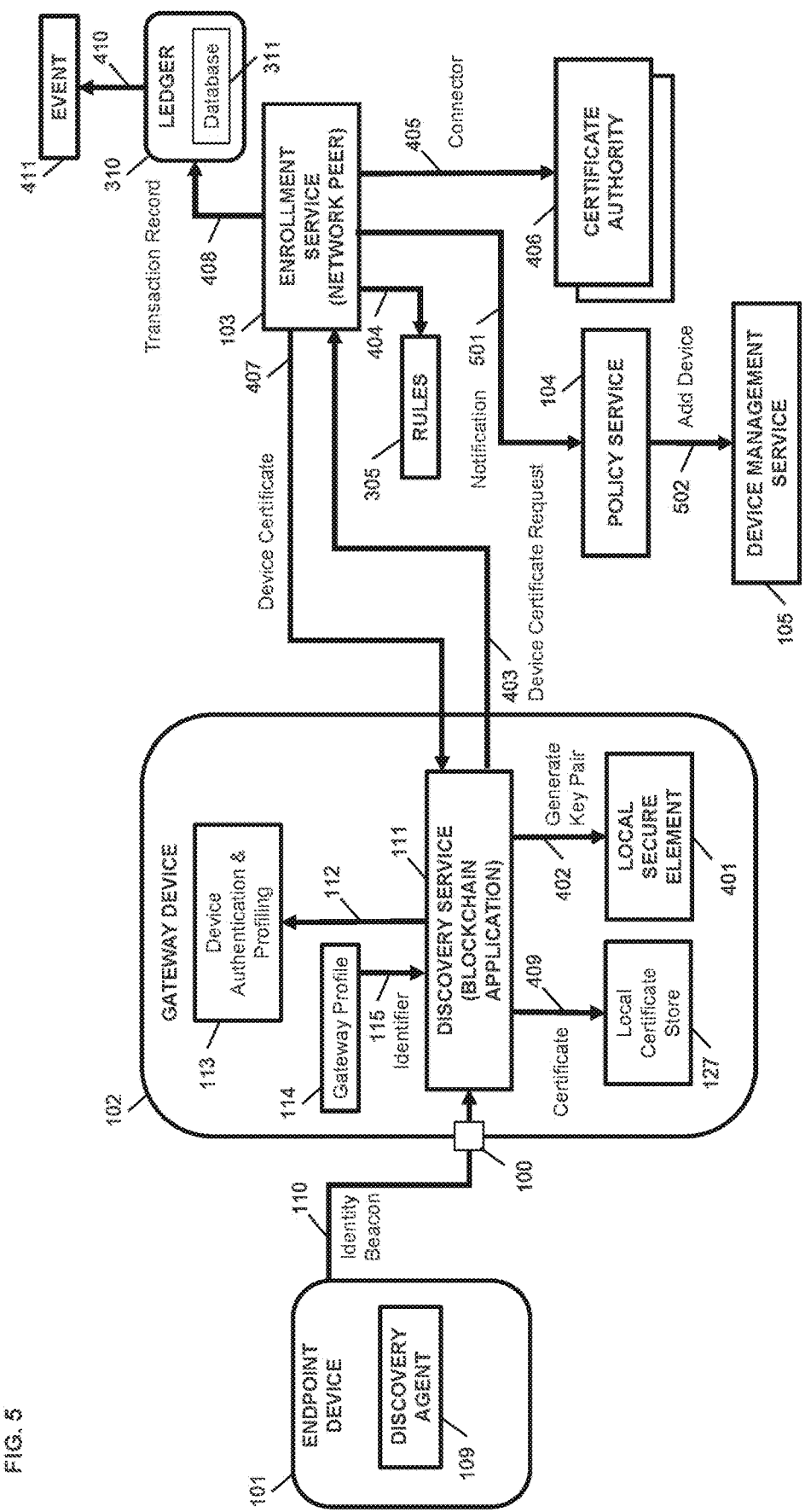
FIG. 5 is a flowchart illustrating a method of device enrollment and registration for on-boarding using a local secure element, certificate authorities, a policy service and a device management service in accordance with various exemplary embodiments of the disclosed system.

Referring to FIG. 5 and FIG. 1, at step 501, the enrollment service 103 sends a notification of device enrollment through an API or publishes over a message bus interface, with at least the endpoint device profile 232 and issued endpoint device certificate, to the policy service 104. At step 502, the policy service 104 adds the device to the device management service 105 through an API or publishes over a message bus interface.

Referring to FIG. 6, FIG. 1, FIG. 3, and FIG. 4, an update provider 601 includes a development system 604 and a release management system 608; and an update publisher 602 includes an update service 107, a local ledger 625, orchestration rules 624 and event 623; and an endpoint device 101 or gateway device 102 includes an update client 603 and a local secure element 401. At step 605, a developer at a development system 604 builds an unsigned update package 607 from package elements 606 that include an update script and a plurality of component updates such as, for example, firmware updates, software updates, configuration updates, operating system patches/updates, device policies, etc. At step 607, the unsigned update package is processed by a release manager at a release management system 608 and stored in a local registry (e.g., a database, etc.). The release management system 608 builds a signed and encrypted update package, wherein the signing is performed using the provider signing key 609 and the encryption is performed using a publisher certificate 610. At step 611, the update service 107 of an update publisher 602 procures a signed and encrypted update package, encrypted using the update publisher's 602 public key and stores it in a local registry (e.g., a database, etc.). The update provider 601 may be configured to build signed and encrypted packages for a plurality of update publishers 602. At step 612, the update service 107 uses the provisioned orchestration rules 624 to configure the update packages to the designated device classes by a plurality of device attributes such as, for example, the device type, make, model, vendor identifiers, etc. At step 616, the update client 603 at gateway device 102, either as self or on behalf of a connected endpoint device 101, sends a request for an update package to the update service 107. The request includes at least the device certificate (i.e., the encryption certificate of the endpoint device 101 or the gateway device 102) with the device profile (e.g., endpoint device profile 232 or connected gateway device profile 114) as extended attributes. The device request may also include a device manifest that is digitally signed using the device signing key (i.e., associated with a device signing certificate also included in the device request for the update service to verify the digital signature) wherein the device manifest is a list of currently installed update packages based on prior (historic) interactions with the update service. This step protects against potential Man-In-The-Middle (MITM) attacks, impersonation attacks to block distribution of legitimate update packages to the device, and/or interception of update packages for reverse engineering to exploit vulnerabilities. At step 619, the requested update package is re-encrypted using the received device certificate and re-signed using the publisher signing key 618 by the update service 107.

In another exemplary embodiment of the disclosed system, at step 620, a transaction record for the device update is generated that includes at least the signed and encrypted device request log, and stored in the local ledger 310 that includes a database function 311. At step 617, the local ledger 625 emits an event 623 that represents a block of device update transactions for integration with applications in a blockchain. At step 621, the update client 603 first verifies the integrity of the received update package using the public key from the provider certificate 615 and the public key from the publisher certificate 614. At step 622, the update client 603 decrypts the received update package using the private key of the endpoint device 101 (or gateway device 102 for update of self) and the local secure element 401.

In one exemplary embodiment of the disclosed system, a plurality of devices may be configured to share the device certificate and associated private key. The update service 107 may in such configurations cache the generated update package at step 619 using a hash of the device certificate for performance optimization and scalability of updates to a large number of devices.

Referring to FIG. 7, FIG. 1, FIG. 3, and FIG. 4, an administrator 700 at the administration dashboard 701 performs an action for the deregistration and disenrollment of a registered and enrolled endpoint device 101 or gateway device 102. At step 702, the administration dashboard 701 sends a certificate revocation request for a device certificate to the enrollment service 103. At step 703, the enrollment service 103 performs administrator authentication and revocation request validation based on the configured orchestration rules 305. At step 704, the enrollment service 103 sends a certification revocation request over a connector to the issuing certificate authority 406. At step 706, the enrollment service 103 sends a notification of device disenrollment through an API or a publish over a message bus interface to the policy service 104. At step 707, the policy service 104 removes the device from the device management service 105 through an API or a publish over a message bus interface.

In another exemplary embodiment of the disclosed system, at step 705, a transaction record of the device disenrollment may be added by the enrollment service 103 to a local ledger 310 that includes a database function 311. At step 708, the ledger 310 emits an event 709 that represents a block of device disenrollment and deregistration transactions for integration with applications in a blockchain.

Figure 8:
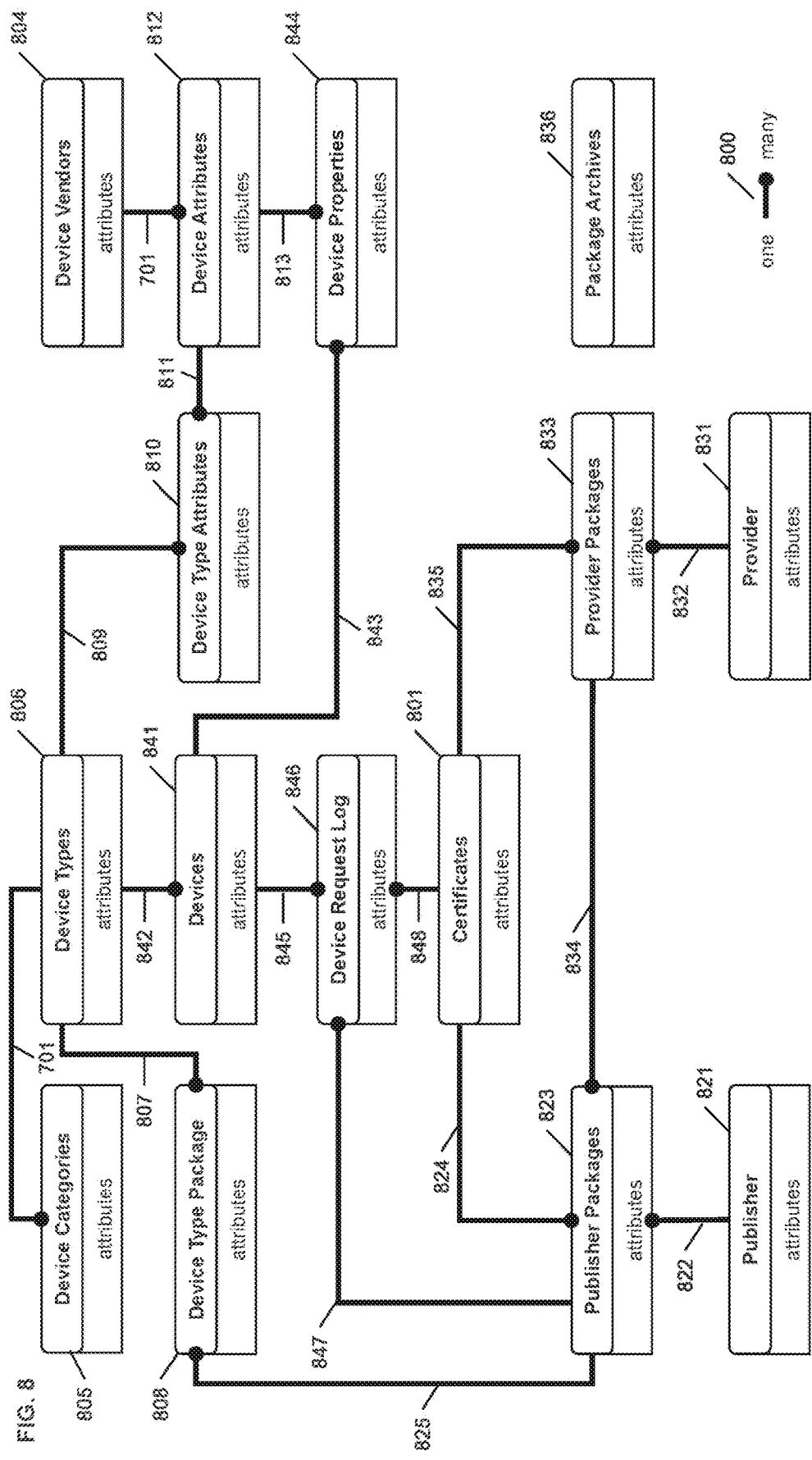
FIG. 8 is a schematic illustrating an entity relationship model including providers, publishers, and classes of devices, for a blockchain applications and network services to orchestrate secure update of a plurality of devices in accordance with various exemplary embodiments of the disclosed system.

Referring to FIG. 8, entities and entity relationships to orchestrate a secure device update on an endpoint device 101 or gateway device 102 are illustrated. The connector 800 between any two entities denotes a one-to-many relationship. Table 1 (below) describes the entity objects and attributes.

| OBJECT | ATTRIBUTES | TYPE |
|---|---|---|
| Device Categories | | |
| | Category Identifier | Integer |
| | Category Name | VARCHAR |
| | Creation Timestamp | DATETIME |
| Device Type Attributes | | |
| | Identifier | Integer |
| | Device Type Identifier | Integer |
| | Device Attributes Identifier | Integer |
| Device Attributes | | |
| | Device Attributes Identifies | Integer |
| | Device Vendor Identifier | Integer |
| | Device Model | VARCHAR |
| Device Properties | | |
| | Device Properties Identifier | Integer |
| | Device Identifier | Integer |
| | Device Attribute Identifier | Integer |
| | Device Attrilnte Value | VARCHAR |
| Device Vendors | | |
| | Vendor Identifier | Integer |
| | Vendor Name | VARCHAR |
| Device Types | | |
| | Device Type Identifier | Integer |
| | Device Category | Integer |
| | Creation Timestamp | DATETIME |
| Device Type Package | | |
| | Identifier | Integer |
| | Device Type Identifier | Integer |
| | Package Identifier | integer |
| Publisher | | |
| | Publisher Identifier | Integer |
| | Publisher Name | VARCHAR |
| Publisher Packages | | |
| | Publisher Package Identifier | Integer |
| | Package Version | VARCHAR |
| | Parkage Obsolete | Integer |
| | Package Type | Integer |
| | Package Category | Integer |
| | Package File | BLOB |
| | Parkage Status | Integer |
| | Publisher Signing Certificate Identifier | Integer |
| | Publisher Signature | VARCHAR |
| | Publisher Encryption Key Alias | VARCHAR |
| | Creation Timesamp | DATETIME |
| | Publisher Identifier | Integer |
| | Provider Package Identifier | Integer |
| Provider | | |
| | Provider Identifier | Integer |
| | Provider Name | VARCHAR |
| Provider Packages | | |
| | Provider Package Identifier | Integer |
| | Package Type | Integer |
| | Provider Identifier | Integer |
| | Package Binary | BLOB |
| | Package Status | Integer |
| | Creation Timestamp | DATETIME |
| | Provider Certificate Identifier | Integer |
| | Provider Signature | VARCHAR |
| | Publisher Encryption Key Alias | VARCHAR |
| Package Archives | | |
| | Package Archive Identifier | Integer |
| | Package Archive Timestamp | TIMESTAMP |
| | Creation Timestamp | DATETIME |
| Signed Encrypted Request Request Data Signed and Encrypted by Publisher | Device Identifier | BLOB |
| | Request Counter | |
| | Request Operation Data | |
| | Request Timestamp | |
| | Request Nonce | |
| | Device Request Signature | |
| Device Request Log | | |
| | Log Index | Integer |
| | Device Identifier | Integer |
| | Request Operation | VARCHAR |
| | Package Identifier | Integer |
| | Request | BLOB |
| | Signed Encrypted Request | BLOB |
| | Creation Timestamp | DATETIME |
| | Request Hash | VARCHAR |
| | Device Signature | BLOB |
| | Device Certificate Identifier | Integer |
| | Publisher Signature | BLOB |
| | Publisher Certificate Identifier | Integer |

Figure 6:
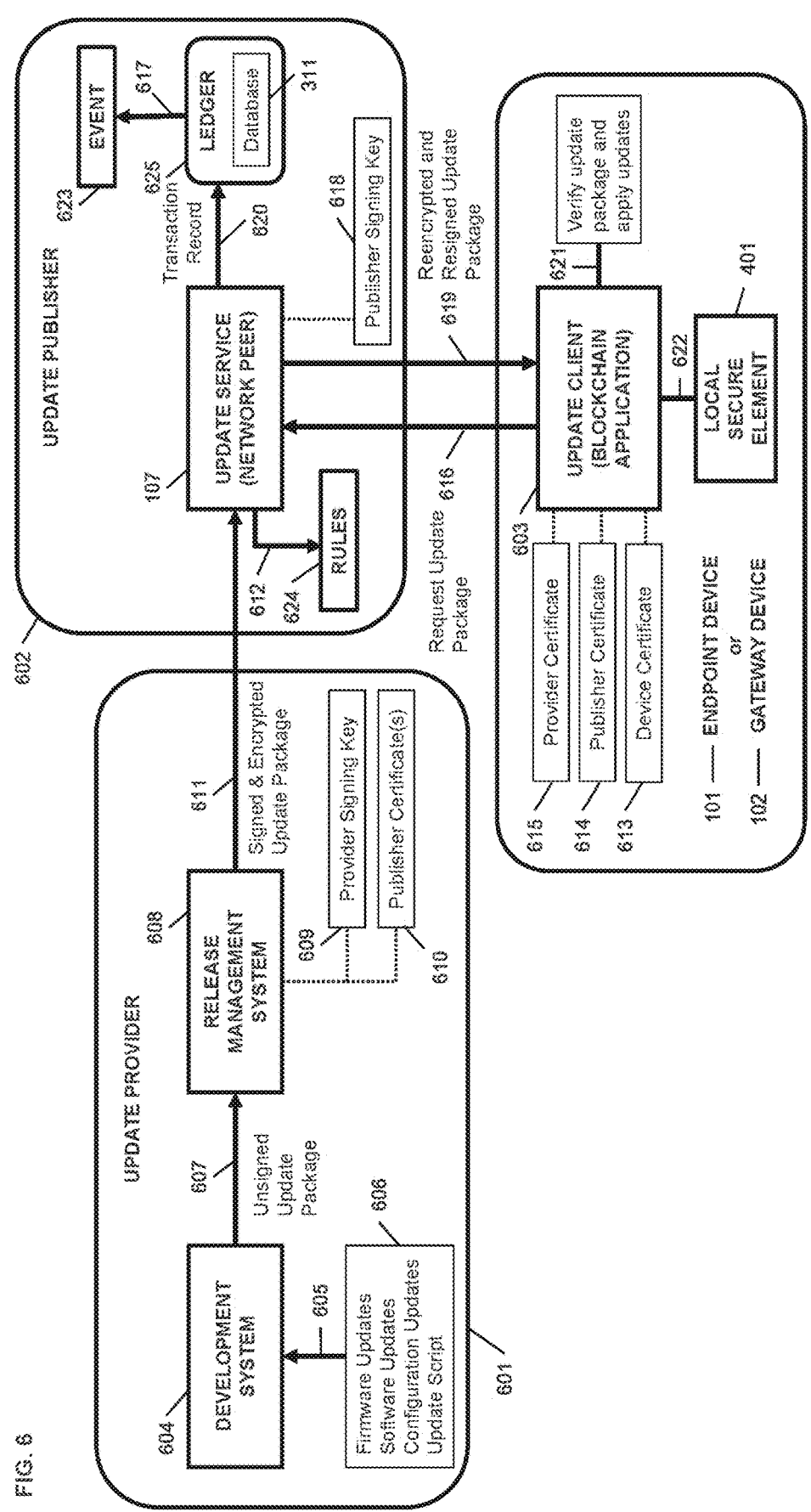
FIG. 6 is a flowchart illustrating a method for secure update of endpoint or gateway devices using an update service, an update client and a local secure element in accordance with various exemplary embodiments of the disclosed system.
Figure 7:
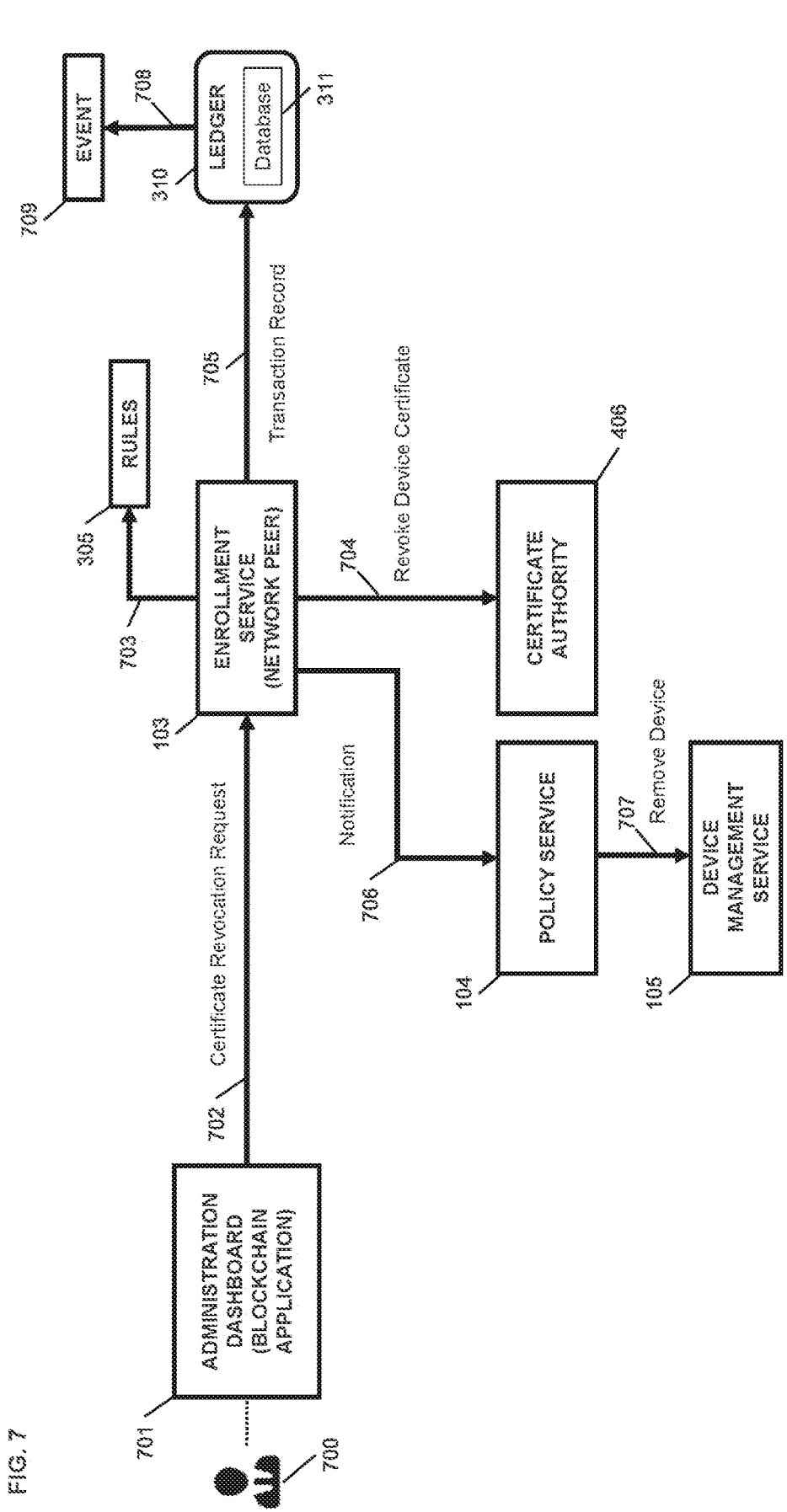
FIG. 7 is a flowchart illustrating a method of device disenrollment and deregistration for off-boarding in accordance with various exemplary embodiments of the disclosed system.
Figure 9:
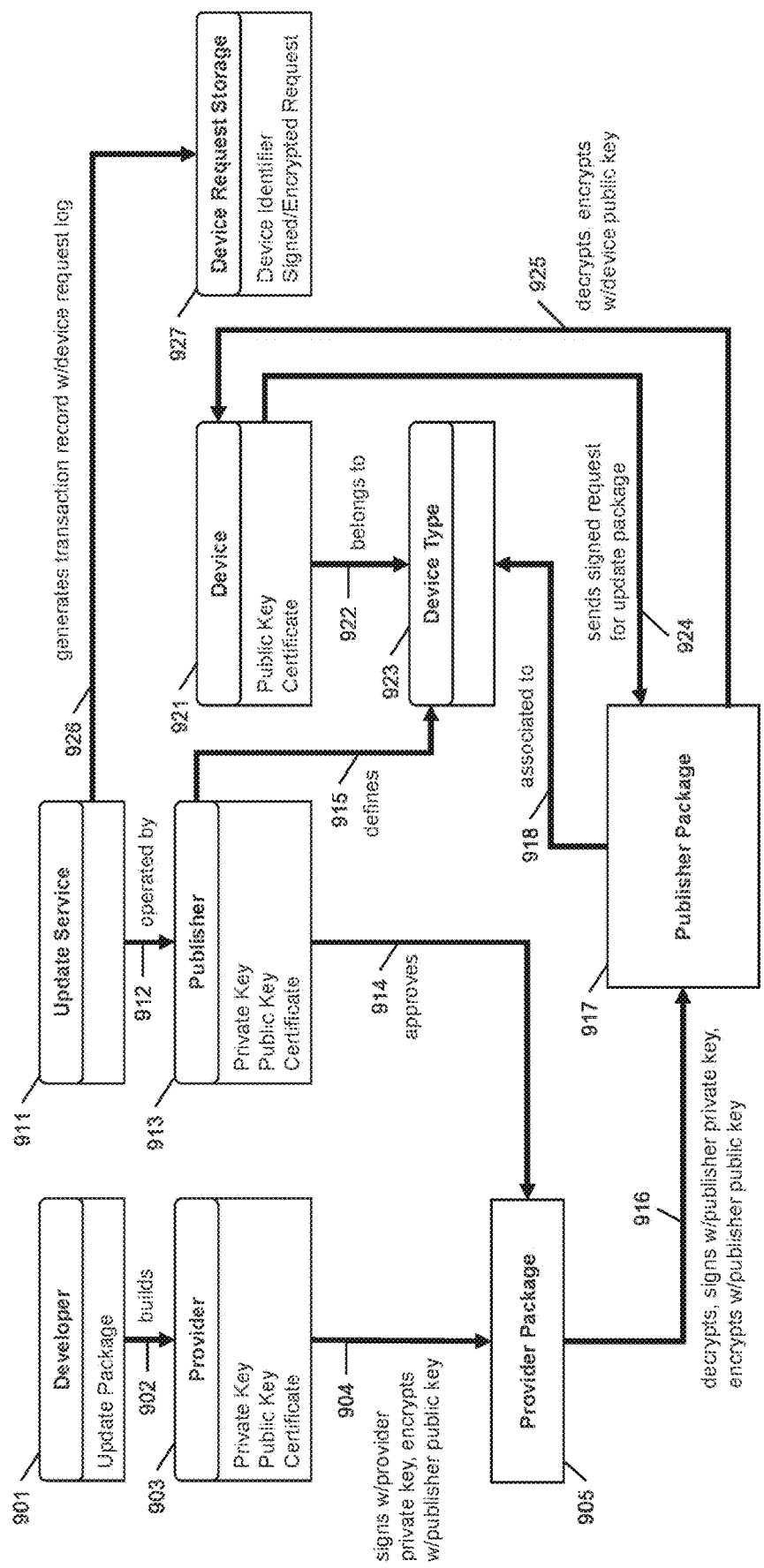
FIG. 9 is a schematic illustrating a workflow model including providers, publishers and consumers of update packages, for a blockchain applications and network services to orchestrate secure update of a plurality of devices in accordance with various exemplary embodiments of the disclosed system.

Referring to FIG. 9, FIG. 8 and FIG. 6, the workflow to orchestrate a secure update on an endpoint device 101 or gateway device 102 is illustrated. At step 902, a developer 901 of provider 903 builds an update package. At step 904, a release manager of provider 903 signs the update package using the provider private key and encrypts the update package using a publisher public key to build a provider package 833. At step 912, an administrator of the update service 911 operated by publisher 913 approves the provider package 833. At step 915, the administrator defines device types 923 and further, at step 922, provisions devices 921 to belong to a device type 923. At step 916, the administrator decrypts the provider package, re-signs the update package using the publisher private key (preserving the first signing by the provider at step 904), and re-encrypts the update package using the publisher public key for secure storage. The preserved first signing by the provider offers tamper protection in the supply chain workflow. At step 918, the administrator of the update service 911 associates the publisher update package 917 to device type 923. At step 924, the device 921 sends a signed request that includes the device certificate, for a publisher update package 917 to the update service 911. At step 925, the update service 911 decrypts the publisher update package using the publisher private key and re-encrypts the update package using the device public key extracted from the received device certificate. At step 926, the update service 911 generates a transaction record that includes at least the signed and encrypted device request log, for device request storage 927 in a local ledger 625.

Figure 10:
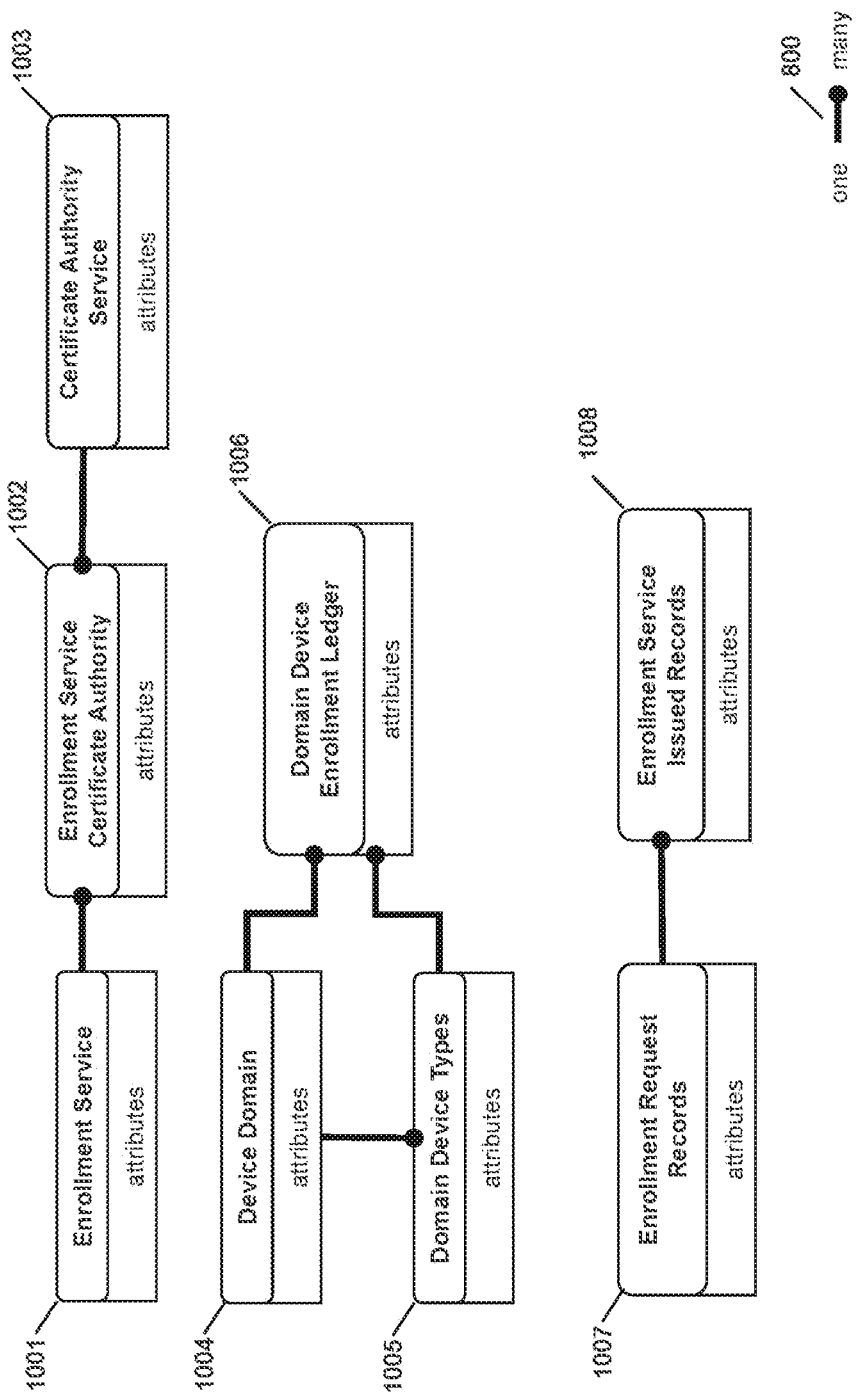
FIG. 10 is a schematic illustrating an entity relationship model including an enrollment service, certificate authority services, device domains and types of devices, for a blockchain applications and network services to orchestrate device enrollment of a plurality of devices in accordance with various exemplary embodiments of the disclosed system.

Referring to FIG. 10, entities and entity relationships to orchestrate an enrollment of an endpoint device 101 or gateway device 102 are illustrated. The connector 800 between any two entities denotes a one-to-many relationship. Table 2 (below) describes the entity objects and attributes.

| OBJECT | ATTRIBUTES | TYPE |
|---|---|---|
| Device Domain | | |
| | Domain Identifier | Integer |
| | Domain Name | VARCHAR |
| | Domain Description | VARCHAR |
| | Domain Owner Information | VARCHAR |
| | Domain Request URI | VARCHAR |
| | Domain Issued URI | VARCHAR |
| | Creation Timestamp | DATETIME |
| Domain Device Types | | |
| | Device Type Identifier | Integer |
| | Domain Identifier | Integer |
| Domain Device Enrollment Ledger | | |
| | Entry Identifier | Integer |
| | Device UUID | VARCHAR |
| | Device Domain Identifier | Integer |
| | Enrollment Record | BLOB |
| | Encrypted Enrollment Record | BLOB |
| | Creation Timestamp | DATETIME |
| | Device Type Identifier | Integer |
| | Enrollment Server Certificate Identifier | Integer |
| | Domain Server Certificate Identifier | Integer |
| | Issued Certificate Identifier | Integer |
| Encrypted Enrollment Record | | |
| | Device UUID | VARCHAR |
| | Certificate Signing Request | BLOB |
| | Enrollment Server Identifier | Integer |
| | Enrollment Server Signature | BLOB |
| | Issued Certificate | BLOB |
| | Domain Signature | BLOB |
| Enrollment Service | | |
| | Enrollment Server Identifier | Integer |
| Enrollment Service Certificate Authority | | |
| | Server Certificate Authority Identifier | Integer |
| | Enrollment Server Identifier | Integer |
| | Certificate Authority Server Identifier | Integer |
| Certificate Authority Service | | |
| | Certificate Authority Server Identifier | integer |
| Enrollment Service Request Records | | |
| | Request Record Identifier | Integer |
| | Creation Timestamp | DATETIME |
| Enrollment Service Issued Records | | |
| | Issued Record Identifier | Iuteger |
| | Request Record Identifier | Integer |
| | Creation Timestamp | DATETIME |

Figure 11:
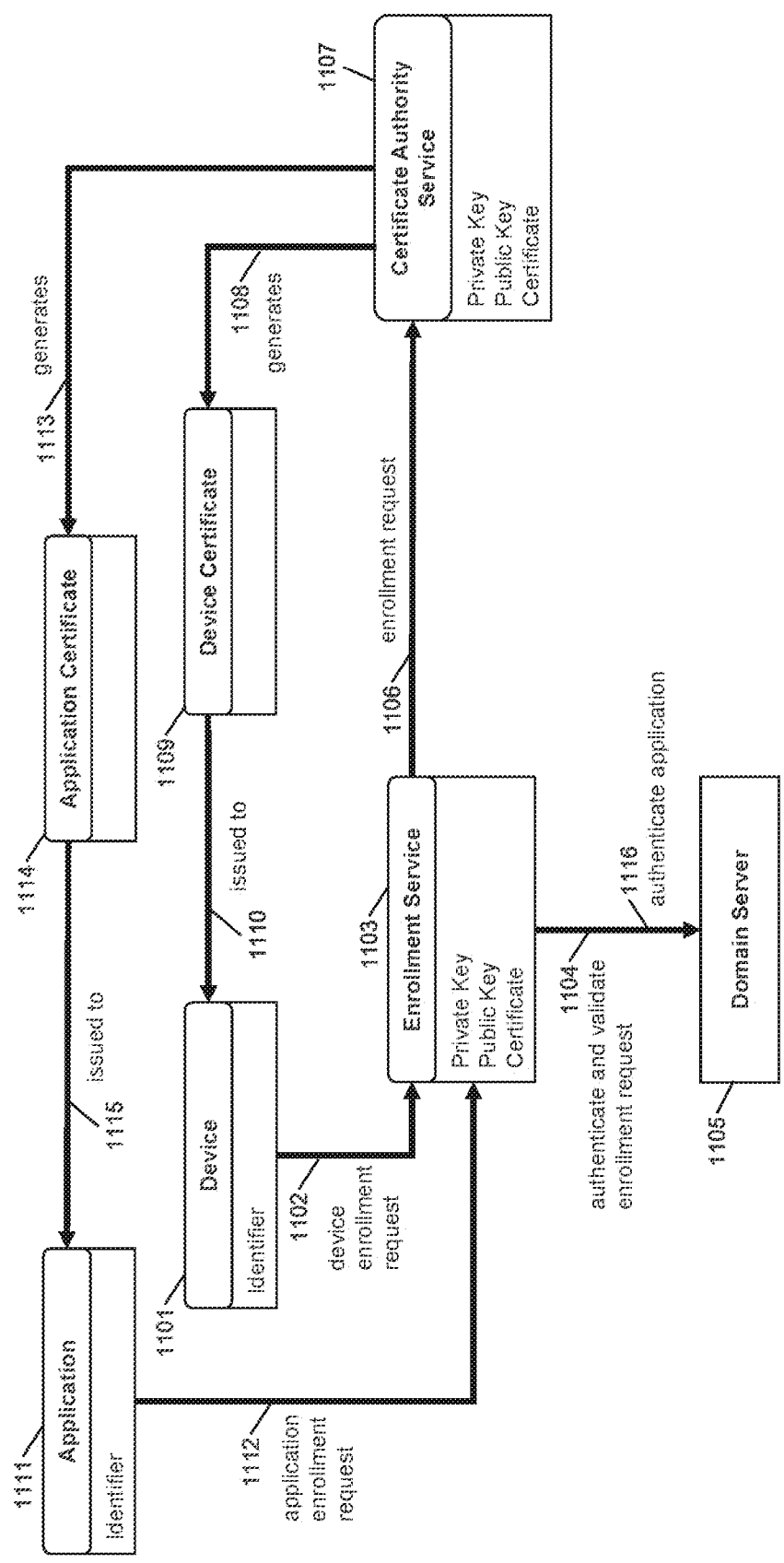
FIG. 11 is a schematic illustrating a workflow model including an enrollment service, certificate authority services, device domains and types of devices, for a blockchain applications and network services to orchestrate device enrollment of a plurality of devices in accordance with various exemplary embodiments of the disclosed system.

Referring to FIG. 11, the workflow to orchestrate an enrollment of an endpoint device 1101, a gateway device 102 or an application on an enrolled device is illustrated. At step 1102, a device 1101 sends an enrollment request that includes a unique device identifier, to the enrollment service 1103. At step 1104, the enrollment service 1103 performs device authentication and may optionally validate the enrollment request with a domain server 1105 associated with a certificate authority. At step 1106, the enrollment service sends a device enrollment request to a certificate authority service 1107 through an API or publishes over a message bus interface. At step 1108, the certificate authority service 1107 generates a device certificate 1109, and at step 1110, the device certificate 1109 is issued to the device 1101 by the enrollment service 1103.

In one exemplary embodiment of the disclosed system, at step 1112, an application 1111 on device 1101 sends an enrollment request, that includes a unique identifier based on an application (or service) principal name, to the enrollment service 1103. At step 1116, the enrollment service 1103 performs application authentication with a domain server 1105 associated with the enrollment domain. At step 1106, the enrollment service sends an application enrollment request to a certificate authority service 1107 through an API or publishes over a message bus interface. At step 1113, the certificate authority service 1107 generates an application certificate 1114, and at step 1115, the application certificate 1114 is issued to the application 1111 by the enrollment service 1103.

Figure 12:
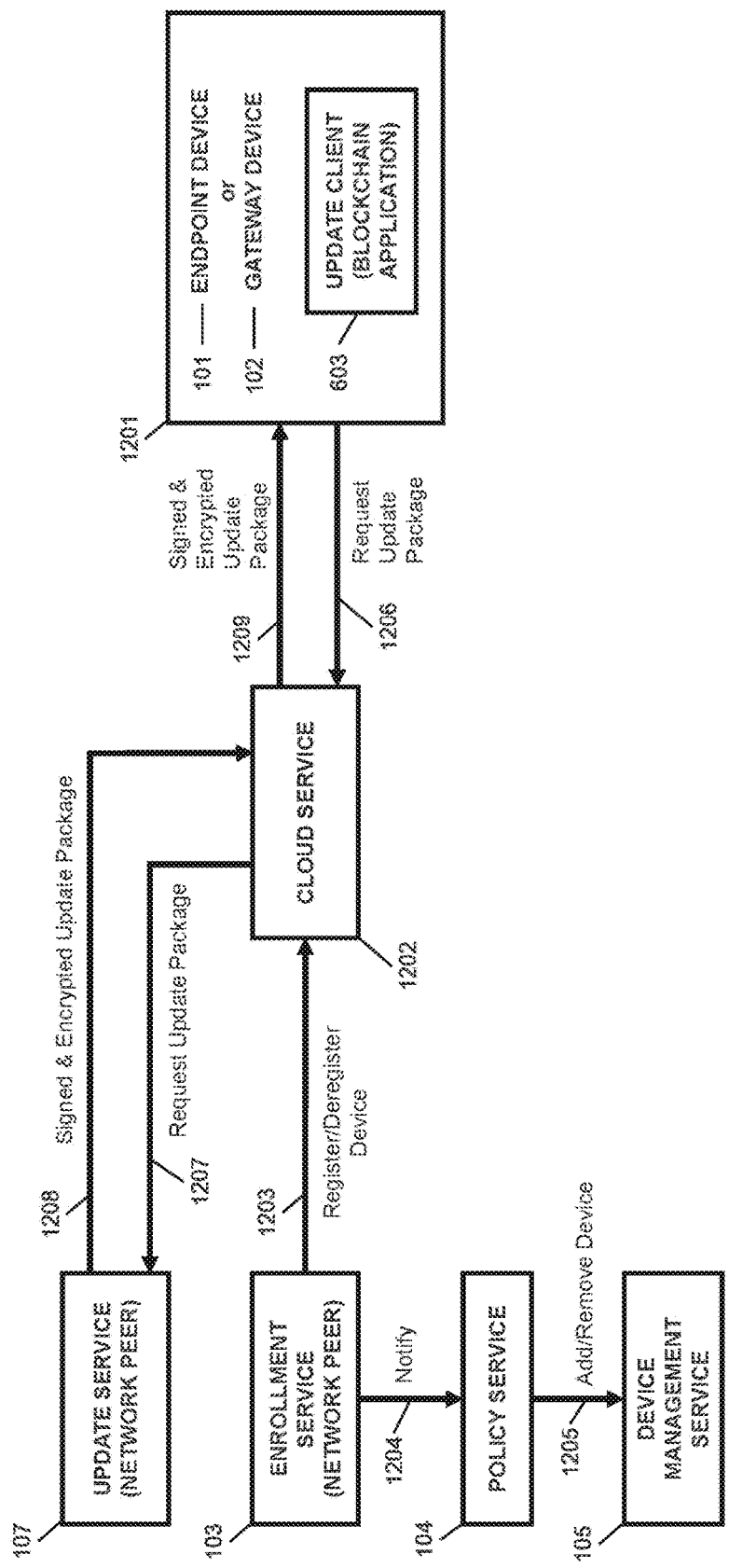
FIG. 12 is a schematic illustrating a workflow model for integration with a cloud service of an enrollment service, an update client, and an update service in accordance with various exemplary embodiments of the disclosed system.

Referring to FIG. 12 and FIG. 1, illustrated is a workflow to integrate the device enrollment and secure update operations on an endpoint device 101 or a gateway device 102 through integration of the enrollment service 103 and the update service 107, respectively, with a cloud service 1202. The cloud service provider may be public, private or community cloud operator and the service may be offered as a Software-as-a-Service (SaaS) or Platform-as-a-Service (PaaS) solution. IoT devices may register directly with the cloud service 1202 for enrollment and updates services. The cloud service 1202 may provide API based connectors for third-party enrollment and updates services.

In one exemplary embodiment of the disclosed system, referring to FIG. 12 and FIG. 1 at step 1203, the enrollment service 103 sends a register (or deregister) device notification to the cloud service 1202 to onboard (or offboard) a cloud connected device. At step 102, the enrollment service 103 notifies a policy service 104 and, at step 1205, the policy service adds or removes the device to or from a device management service 105 through an API or publishes over a message bus interface.

In yet another exemplary embodiment of the disclosed system, referring to FIG. 12, FIG. 6, and FIG. 1 at step 1206, an update client 603 at an endpoint device 101 or gateway device 102 sends a request, including at least the device certificate, for an update package to the cloud service 1202. At step 1207, the cloud service 1202 may forward the received request for an update package from the device to the update service 107. In an alternate method, the cloud service may preload, and cache signed and encrypted update packages for a plurality of device types. At step 1208, the update service 107 sends the signed and encrypted update package for the device to the cloud service 1202 to forward to the device (at step 1209).

In an exemplary embodiment of the disclosed system, an endpoint device 101 or gateway device 102 may use a plurality of update services associated with multiple update publishers 601 to request multiple update provider 602 update packages.

In an exemplary embodiment of the disclosed system, transaction records 309, 408, 620, 705 in local ledgers 310 are distributed to the network peers and chained using a hash of the signed and encrypted device request log of an endpoint or gateway device by the enrollment service 103 or update service 107. Further, the transaction records in the distributed ledger in the blockchain provide a reproducible history of device and service transactions for cross-domain traceability across the supply chain of update package providers 601 and publishers 602.

In an exemplary embodiment of the disclosed system, a plurality of intermediate publishers may serve as distributors of update packages, wherein each intermediate publisher signs the update package.

In an exemplary embodiment of the disclosed system, the enrollment service 103 integrates via APIs with cloud services using a digital hash digest of an endpoint device 101 or gateway device 102 certificate to enroll the device. Further, the update service 107 integrates via APIs with cloud services to deliver update packages to a device enrolled with the cloud service.

In an exemplary embodiment of the disclosed system, the local secure element 401 may be, for example, a Trusted Platform Module (TPM), a Subscriber Identity Module (SIM), a Microcontroller based cryptographic engine with secure key generation and key storage capabilities, etc. The remote secure element 307 may be a network or cloud based HSM.

Referring to FIG. 13 and FIG. 2, at block 1300, the multi-stage verified boot loader 1301 (embodiment 240 of block 205) verifies the digital signatures of program image 1302 (embodiment 250 of block 203). At steps 1303, 1304, 1305 the digital signatures A, B and C are verified using keys A, B and C respectively, as an example of a plurality of keys and digital signatures that may be verified. This method illustrates a logical AND operation wherein the authentic publisher signs the program image using a plurality of signing keys. At block 1320, the multi-stage verified boot loader 1321 (embodiment 240 of block 205) verifies the digital signatures of program image 1323, 1325, or 1327 (embodiments 250 of block 203). At steps 1322, 1324 and 1326 the digital signatures A, B or C are verified using key A, B or C, as an example of a plurality of keys and digital signatures that may be verified. This method illustrates a logical OR operation in which the authentic publisher signs the program image using only one of a plurality of signing keys.

At block 1340, the workflow illustrates countermeasures to deal with a compromised private signing key associated with public key A, as an example. The authentic publisher of the program image (embodiment 250 of block 203) expires use of the compromised key A and signs the program image using keys B and C. At steps 1343 and 1344, the multi-stage verified boot loader 1341 (embodiment 240 of block 205) verifies all, and at least two, of the unique digital signatures included in the signed program image. Use of the compromised key A was excluded by the publisher. This method illustrates a non-block logical AND operation with a plurality of key pairs. At step 1346, the multi-stage verified boot loader 1341 verifies the digital signature in the signed program image 1345 generated using the compromised signing key A by an attacker in possession of the compromised key. However, a requirement of the signing specification 233 for at least two digital signatures in a signed program image disqualifies the program image verification and protects the device from the attacker's program image 1345. At step 1349, the multi-stage verified boot loader 1341 verifies the two digital signatures in the signed program image 1347 generated using the compromised signing key A by an attacker in possession of the compromised key. However, a requirement of the signing specification 233 for uniqueness of the digital signatures in a signed program image disqualifies the program image verification and protects the device from the attacker's program image 1347.

An exemplary embodiment is directed to a method of device identification for enrollment and registration of an endpoint device 101 that is connected to a gateway device 102. The method uses a multi-stage verified boot loader 240, a discovery agent 109 at the endpoint device 101, a discovery service 111 at the gateway device 102, an enrollment service 103, a policy service 104, and a device management service 105. The method can include: sending, by the discovery agent 109 on the endpoint device 101, to the discovery service 111 on the gateway device 102, an authenticated identity beacon 110 with an endpoint device profile 232. The method can include verifying, by the discovery service 111, authentication of the endpoint device 101 and the endpoint device profile 232; and generating, by the discovery service 111, a certificate request 116 for the endpoint device 101 from a privacy certificate authority. The method can include sending, by the discovery service 111, the certificate request for the endpoint device 101 to the enrollment service 103. The method can include processing, by the enrollment service 103, the certificate request for the endpoint device 101 that is received to translate the certificate request for a certificate authority 406; and sending, by the enrollment service 103 to the certificate authority 406, the translated certificate request for the endpoint device 101. The method can include receiving, by the enrollment service 103, a certificate for the endpoint device 101 issued by the certificate authority 406; and processing, by the enrollment service 103, the received certificate for the endpoint device 101 to translate the received certificate for the endpoint device 101 to represent a privacy certificate authority. The method can include sending, by the enrollment service 103, the certificate for the endpoint device 101 to the discovery service 111; and sending, by the enrollment service 103, a notification of endpoint device registration to the policy service 104. The method can include sending, by the policy service 104, a directive to add the endpoint device 101 to a device management service 105; and storing, by the discovery service 111, the issued endpoint device certificate in a local certificate store 127.

In an exemplary embodiment, the identity beacon 110 includes a unique endpoint device identifier 231, endpoint device type, endpoint device make, and endpoint device model, wherein the endpoint device identifier 231 is authenticated based on a multi-stage verified boot sequence of the endpoint device from power on.

In an exemplary embodiment, the multi-stage verified boot sequence is performed by a multi-stage verified boot loader that verifies multiple sets of digital signatures associated with a signed program image on the endpoint device 101 using multiple matching sets of public keys to verify digital signatures generated using corresponding private signing keys by an image signer 201.

In an exemplary embodiment, the program image to be verified is at least one of: a first stage boot loader, a second stage boot loader, and an operating system loader on the endpoint device 101, wherein the multi-stage verified boot loader 240 may be injected at any stage of the boot sequence.

In an exemplary embodiment, the digital signatures are verified based on a logical AND or OR operator as a countermeasure to detect compromise of one or more public-private key pairs associated with the signing and verification process, wherein placement order of the digital signatures and signature match criteria is based on a signing specification.

In an exemplary embodiment, the logical AND operation requires at least two unique digital signatures in the signed program image to be verified.

In an exemplary embodiment, the multi-stage verified boot loader 240 is injected into a boot sequence to forward verify a plurality of subsequent stage boot loaders, images, configuration and data files without requiring any modification to the subsequent stage boot loaders.

An exemplary embodiment is directed to a method of deregistering a device 101, 102 using an administration dashboard 701, an enrollment service 103, a policy service 104, and a device management service 105. The method can include initiating, from the administration dashboard 701 by an authenticated and privileged user, an action to revoke a device certificate; and sending, by the enrollment service 103, a revocation command 704 to a certificate authority 406. The method can include sending, by the enrollment service 103, a notification of device certificate revocation to the policy service 104. The method can include sending, by the policy service 104, to the device management service 105, a directive to remove the device 101,102.

An exemplary embodiment is directed to a method of endpoint device 101 enrollment using a discovery service 111 on a gateway device 102 as a blockchain application and an enrollment service 103 in the network as a blockchain network peer. The method includes sending, by the discovery service 111, an enrollment request 301 for the endpoint device 101 to the enrollment service in a network. The method can include receiving, by the enrollment service 103, the enrollment request 301 and authenticating the gateway device 102. The method can include generating, by the enrollment service 103, a certificate issued by a certificate authority 406 for the endpoint device 101 based on orchestration rules 305 established for a network service of the network. The method can include sending, by the enrollment service 103, the certificate for the endpoint device 101 to the gateway device 102. The method can include recording, by an update service 107, a request log for the endpoint device as a transaction record 309 in the local ledger 310, and distributing blocks of transaction records 309 to blockchain peers to maintain a distributed ledger to reproduce device history.

In an exemplary embodiment, the request log for the endpoint device is signed and encrypted and includes at least a request counter, request operation data, a request timestamp, a request nonce, a device request signature, a request hash, a device signature, a device certificate identifier, a publisher signature, a publisher certificate identifier, a package identifier, a device identifier, a provider identifier, and a publisher identifier.

In an exemplary embodiment, a distributed ledger in the blockchain has adequate transaction records to reproduce history of device and service transactions for cross-domain traceability across the supply chain of update package providers and publishers.

In an exemplary embodiment, a device disenrollment request 702 may be issued from an administrative dashboard 701 for generating by the enrollment service 103 a certificate revocation request 704 to a certificate authority 406 for disenrollment of the endpoint device 101 and recording the request log for the endpoint device 101 as a transaction record in the local ledger.

An exemplary embodiment is directed to a method of updating a registered device (e.g., endpoint device 101, gateway device 102) using a development system 604 and a release management system 608 operated by an update provider 601, an update service 107 operated by an update publisher 602, an update client 603 on the device 101, 102, and a local secure element 401 on the device 101, 102. The method can include building, on the development system 604, an update package including at least one of a firmware update, a software update, a configuration update, and an update script. The method can include signing, by the release management system 608, the update package 607 using a provider signing key 609, wherein a first digital signature is included in the update package. The method can include encrypting, by the release management system 608, the signed update package using a publisher public key from a publisher certificate 610 for the update publisher 602 for initial encryption of the update package. The method can include sending, by the release management system 608, the signed and encrypted update package 611 to the update service 107. The method can include requesting, by the update client 603 on the device 101, 102, an update package. The request can include at least the vendor identifier, the model number, and a device certificate 613 for the device. The method can include resigning, by the update service 107, the signed update package using a publisher signing key 618. A second digital signature is included in the update package. The method can include reencrypting, by the update service 107, the doubly signed update package by decrypting the initial encryption using a publisher private key from the update publisher 602, and encrypting the update package using a device public key from the device certificate 613, for final encryption of the update package. The method can include sending, by the update service 107, the encrypted and doubly signed update package 619 to the update client 603 on the device 101, 102. The method can include decrypting, by the update client 603, the encrypted update package using a device private key for the device 101, 102. The method can include verifying, by the update client 603, the first and second digital signatures using the respective public keys from the update provider 601 and publisher certificates issued by a certificate authority 406. In an exemplary embodiment, the update script is executed on the device to apply the update package to the device 101, 102.

In an exemplary embodiment, the initial encryption of the update package is performed using a symmetric key, and the symmetric key is further encrypted using the publisher public key. A message digest of the update package is generated, and the first digital signature for the message digest is generated using a provider private key from the update provider 601. The first digital signature is further encrypted using the publisher public key.

In an exemplary embodiment, the final encryption of the update package is performed using a symmetric key, and the symmetric key is further encrypted using the device public key. A message digest of the update package is generated, and the second digital signature for the message digest is generated using a publisher private key from the update provider 601. The second digital signature is further encrypted using the device public key.

In an exemplary embodiment, the device private-public keypair for the encryption may be generated by the secure element 401 on the device 101, 102, and the device private key is protected within the secure element 401. A device certificate for the device public key is issued by a certificate authority 406.

An exemplary embodiment is directed to a method of updating a device (e.g., an endpoint device 101, a gateway device 102) using an update client 603 on the device 101, 102 as a blockchain application, an update service 107 in a network as a blockchain network peer, orchestration rules 624, and a ledger 625. The method can include sending, by the update client 603, a device request 616 for an update package for the device 101, 102 from the update service 107 in the network. The method can include receiving, by the update service 107, the device request and authenticating the device 101, 102. The method can include preparing, by the update service 107, based on the received device manifest a signed and encrypted update package based on the orchestration rules 624 established for a network service of the network. The method can include sending, by the update service 107, the signed and encrypted update package to the device 101, 102. The method can include recording, by the update service 107, a request log for the device as an entry in the ledger 625, and distributing blocks of transaction records to blockchain peers to maintain a distributed ledger to reproduce history of the device 101, 102.

In an exemplary embodiment, the request log for the device is signed and encrypted and includes at least a request counter, request operation data, a request timestamp, a request nonce, a device request signature, a request hash, a device signature, a device certificate identifier, a publisher signature, a publisher certificate identifier, a package identifier, a device identifier, a provider identifier, and a publisher identifier.

In an exemplary embodiment, the distributed ledger in the blockchain has adequate transaction records to reproduce a history of the device 101, 102 and service transactions for cross domain traceability across a supply chain of update package providers and publishers.

An exemplary embodiment is directed to a method of securing data transport between an endpoint device 101, that does not have an IP address, and a gateway device 102 that is connected to the endpoint device using a discovery agent 109, a discovery service 111, an enrollment service 103, a policy service 104, and a device management service 105. The method can include sending, by the discovery agent 109 on the endpoint device 101, to the discovery service 111 on the gateway device 102, an authenticated identity beacon 110 with a device profile of the endpoint device. The method can include verifying, by the discovery service 111, authentication of the endpoint device 101 and the device profile; and generating, by the discovery service 111, a certificate request for the endpoint device 101 from a privacy certificate authority to the enrollment service 103. The method can include processing, by the enrollment service 103, the certificate request for the endpoint device 101 that is received to translate the certificate request for a certificate authority 406. The method can include sending, by the enrollment service 103 to the certificate authority 406, a certificate request for the endpoint device 101; and receiving, by the enrollment service 103, a certificate for the endpoint device 101 issued by the certificate authority 406. The method can include processing, by the enrollment service 103, the received certificate for the endpoint device 101 to translate the received certificate for the endpoint device 101 to represent a privacy certificate authority. The method can include sending, by the enrollment service 103, to the discovery service 111, the certificate for the endpoint device 101. The method can include sending, by the enrollment service 103, a notification of endpoint device registration to a policy service 104; and sending, by the policy service 104, to a device management service 105 a directive to add the endpoint device 101. The method can include storing, by the discovery service 111, an issued endpoint device certificate in a local certificate store of the gateway device 102. The method can include receiving, by an application on the gateway device 102, data in transit from/to the endpoint device 101 and performing cryptographic operations on the data using the certificate for the endpoint device 101 from the local certificate store, for secure data transport.

In an exemplary embodiment, the identity beacon 110 includes a unique endpoint device identifier 231, endpoint device type, endpoint device make, and endpoint device model. The endpoint device identifier is authenticated based on a multi-stage verified boot sequence of the endpoint device 101 from power on.

In an exemplary embodiment, the multi-stage verified boot sequence is performed by a multi-stage verified boot loader that verifies multiple sets of digital signatures associated with a signed program image on the endpoint device 101 using multiple matching sets of public keys to verify digital signatures generated using corresponding private signing keys by an image signer 201.

In an exemplary embodiment, the program image to be verified is at least one of: a first stage boot loader, a second stage boot loader, and an operating system loader on the endpoint device 101. The multi-stage verified boot loader 240 may be injected at any stage of the boot sequence.

In an exemplary embodiment, the digital signatures are verified based on a logical AND or OR operator as a countermeasure to detect compromise of one or more public-private key pairs associated with the signing and verification process. The placement order of the digital signatures and signature match criteria is based on a signing specification.

In an exemplary embodiment, the logical AND operation requires at least two unique digital signatures in the signed program image to be verified.

In an exemplary embodiment, the multi-stage verified boot loader 240 is injected into a boot sequence to forward verify a plurality of subsequent stage boot loaders, images, configuration and data files without requiring any modification to the subsequent stage boot loaders.

In an exemplary embodiment, the update client 108 on the endpoint device 101 or gateway device 102 may discover dynamic device attributes that may comprise device properties (e.g., profile), platform properties (e.g., processor architecture, operating system type and version), and extended properties (e.g., factory configured settings).

Figure 14:
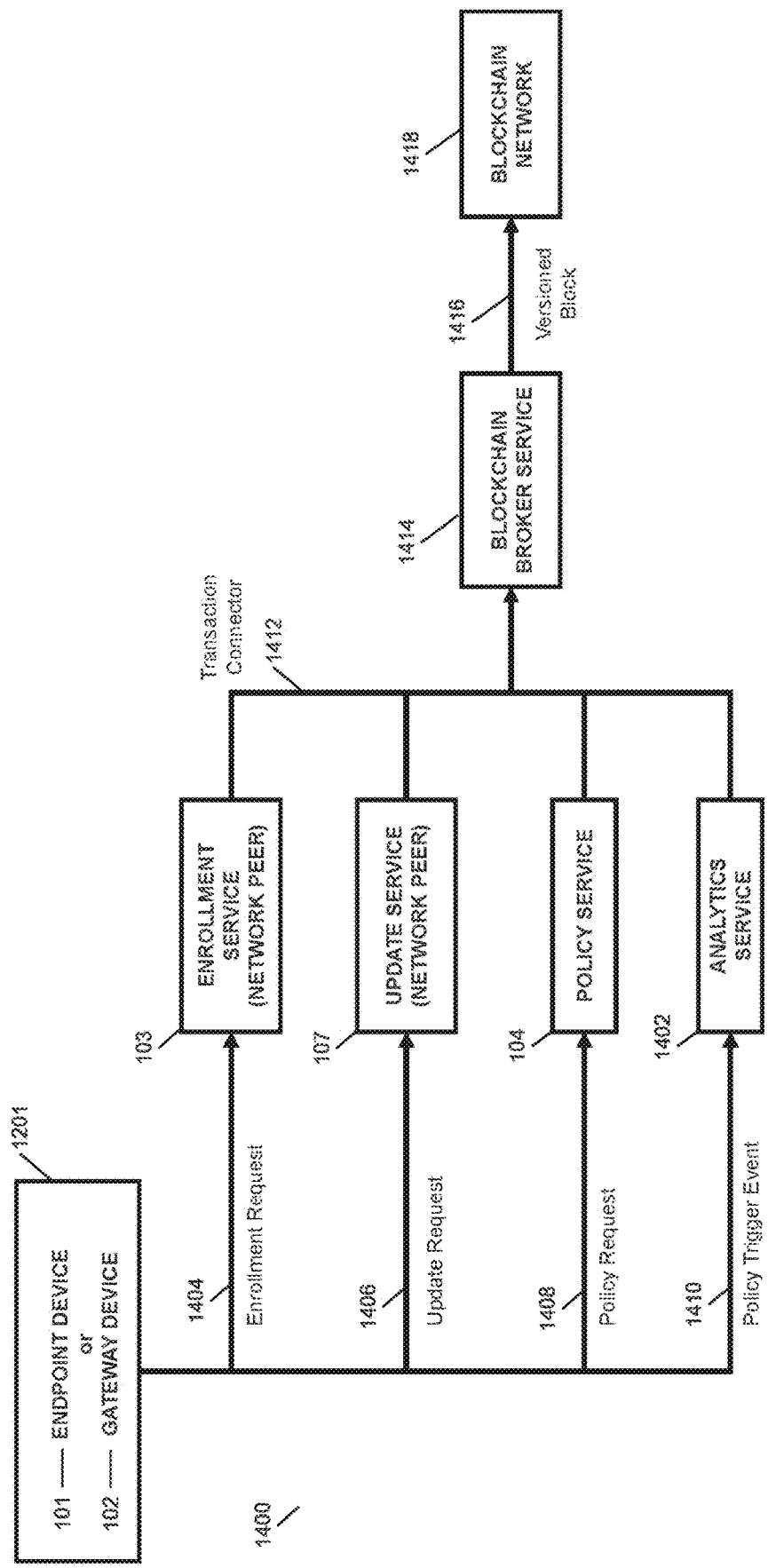
FIG. 14 is a schematic diagram illustrating a system and method that provides policy based anonymization of entity identifiers and itemized filtering of content in the transaction record for data privacy and protection.

FIG. 14 describes a system and method that comprises of a plurality of Internet Protocol (IP) enabled and non-IP distributed devices (e.g., IoT field and edge devices and gateways), device management services (e.g., an enrollment service, an update service, a policy service, an analytics service), a blockchain broker service that serves as a node in a blockchain network, and a transaction connector from the device management services to the blockchain broker service. In one embodiment, neither the device nor the device management service directly participates in the blockchain. In one embodiment, a blockchain broker service participates as a proxy node in the blockchain network for the devices and device management services. Further, the blockchain broker service may provide policy based (e.g., smart contract, local rules) anonymization of entity identifiers and itemized filtering of content in the transaction record, prior to submission of transactions as a versioned block, for data privacy and protection.

Referring to FIG. 14, at step 1404 an endpoint device 101 or gateway device 102 may send an enrollment request comprising at least an authentication and identification artifacts to an enrollment service 103. The enrollment service 103 may verify the received artifacts and process the operation request to issue, renew, or rekey a certificate associated with the device 101, 102. A record of the enrollment operation, comprising a plurality of verified and non-repudiable artifacts associated with device enrollment, may be transmitted over a transaction connector 1412 to a blockchain broker service 1414. At step 1416, the blockchain broker service may generate and send a versioned block for an enrollment operation to the blockchain network to update a distributed ledger. One of ordinary skill in the art will appreciate that many methods of adding a block to a blockchain exist and would be substantially the same as the mechanism described herein.

At step 1406 an endpoint device 101 or gateway device 102 may send an update request comprising at least an authentication and identification artifacts to an update service 107. The update service 107 may verify the received artifacts, and process the operation request to prepare and send update packages to the device 101, 102 based on configured policies. A record of the update operation, comprising of a plurality of verified and non-repudiable artifacts associated with the update package supply chain provenance, provider and publisher operations associated with the update package distribution and publication respectively, may be transmitted over a transaction connector 1412 to a blockchain broker service 1414. At step 1416, the blockchain broker service may generate and send a versioned block for an update operation to the blockchain network to update a distributed ledger. One of ordinary skill in the art will appreciate that many methods of adding a block to a blockchain exist and would be substantially the same as the mechanism described herein.

In one embodiment, the release management system 608 of the update provider 601 may transmit a record of an update distribution operation over a transaction connector 1412 to a blockchain broker service 1414.

In one embodiment, the update service 107 of the update publisher 602 may transmit a record of an update publish operation over a transaction connector 1412 to a blockchain broker service 1414.

At step 1408 an endpoint device 101 or gateway device 102 may send a policy request comprising at least an authentication and identification artifacts to a policy service 104. The policy service may verify the received artifacts, and process the operation request to prepare and send policies for continuous runtime monitoring to the device 101, 102 based on device type and qualifying criteria. A record of the policy configuration operation, comprising unique policy and rule identifiers and grammar, may be transmitted over a transaction connector 1412 to a blockchain broker service 1414. At step 1416, the blockchain broker service may generate and send a versioned block for a policy configuration operation to the blockchain network to update a distributed ledger. One of ordinary skill in the art will appreciate that many methods of adding a block to a blockchain exist and would be substantially the same as the mechanism described herein.

At step 1410 an endpoint device 101 or gateway device 102 my send a policy trigger event comprising at least an authentication, identification and signed event related data artifacts to an analytics service 1402. The analytics service may verify the received artifacts and process the operation request to prepare and transmit a record of the detected in-field device activity based on the policy trigger, comprising of at least the episode information, runtime state measurements and device integrity scores, over a transaction connector 1412 to a blockchain broker service 1414. At step 1416, the blockchain broker service may generate and send a versioned block of episode information, runtime state measurements and device integrity scores to the blockchain network to update a distributed ledger. One of ordinary skill in the art will appreciate that many methods of adding a block to a blockchain exist and would be substantially the same as the mechanism described herein.

In one embodiment, the blockchain broker service 1414 may apply transaction filters based on the configured broker service policies for information filtering and anonymization.

Figure 15:
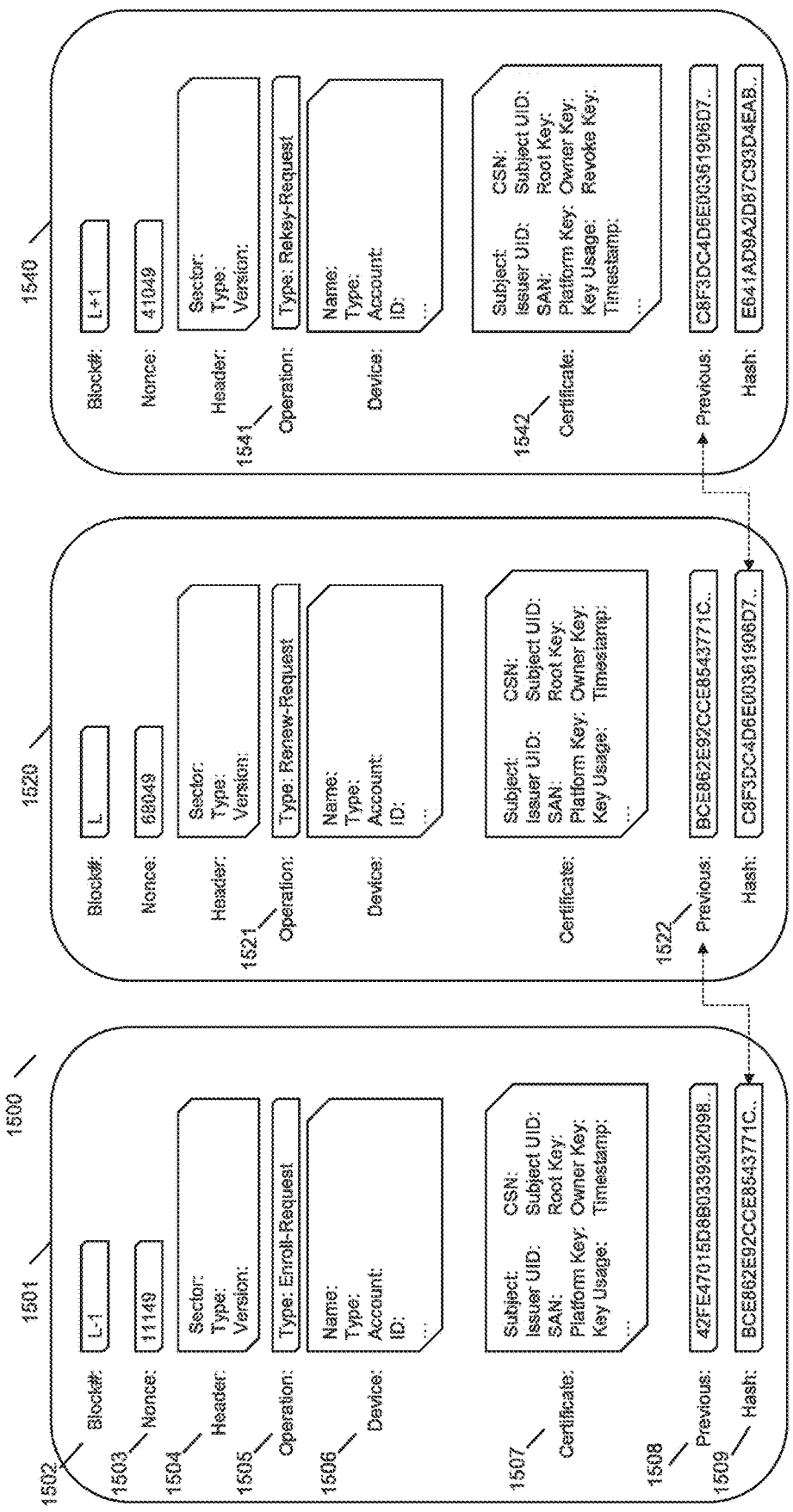
FIG. 15 is a schematic diagram illustrating a block schema to track a chain of custody of a device from a silicon fabrication plant, an original equipment manufacturer (OEM), a platform owner, to a device owner as a distributed ledger in a blockchain.

FIG. 15 describes a block schema to track a chain of custody of a device from a silicon fabrication plant, an original equipment manufacturer (OEM), a platform owner, to a device owner as a distributed ledger in a blockchain wherein a remote enrollment service associated with the device and a transaction connector associated with the enrollment service may submit transactions (equivalent to proof of work and proof of authorization) to a blockchain broker service node on a blockchain network.

Referring to FIG. 15, in block 1501, block #1502 represents a block sequence number in a blockchain and nonce 1503 is a random number based on requirements to hash the block in the blockchain. A header section 1504 comprises at least the industry sector, type of block data, and version of the block data format (or schema). An operation 1505, 1521, 1541 describes a type of operation (transaction) requested by the device (e.g., enroll, renew, rekey, revoke). A device section 1506 comprises at least a device name, a device type, an authentication account (credential), and a unique identifier (ID) for the device. A certificate section 1507 comprises at least a subject name associated with a certificate, a certificate serial number (CSN), a unique identifier (UID) of the issuer of the certificate, a subject unique identifier, a subject alternate name (SAN) in the certificate, a root (public) key associated with the device (hardware, firmware or software based root of trust), a platform (public) key issued to the device, an owner (public) key associated with ownership of the device, an intended usage of the key (e.g., signing, encryption, . . . ), and a timestamp for date and time of the operation. Previous 1508 is a hash of a preceding block in the blockchain (not shown) and Hash 1509 is a hash of block 1501. In block 1520, Previous 1522 refers to Hash 1509 of block 1501 in the blockchain. In block 1540, a certificate 1542 includes a revoke key associated with a rekey operation 1541.

In one embodiment, the device key revocation may be performed as a revoke request operation type.

Figure 16:
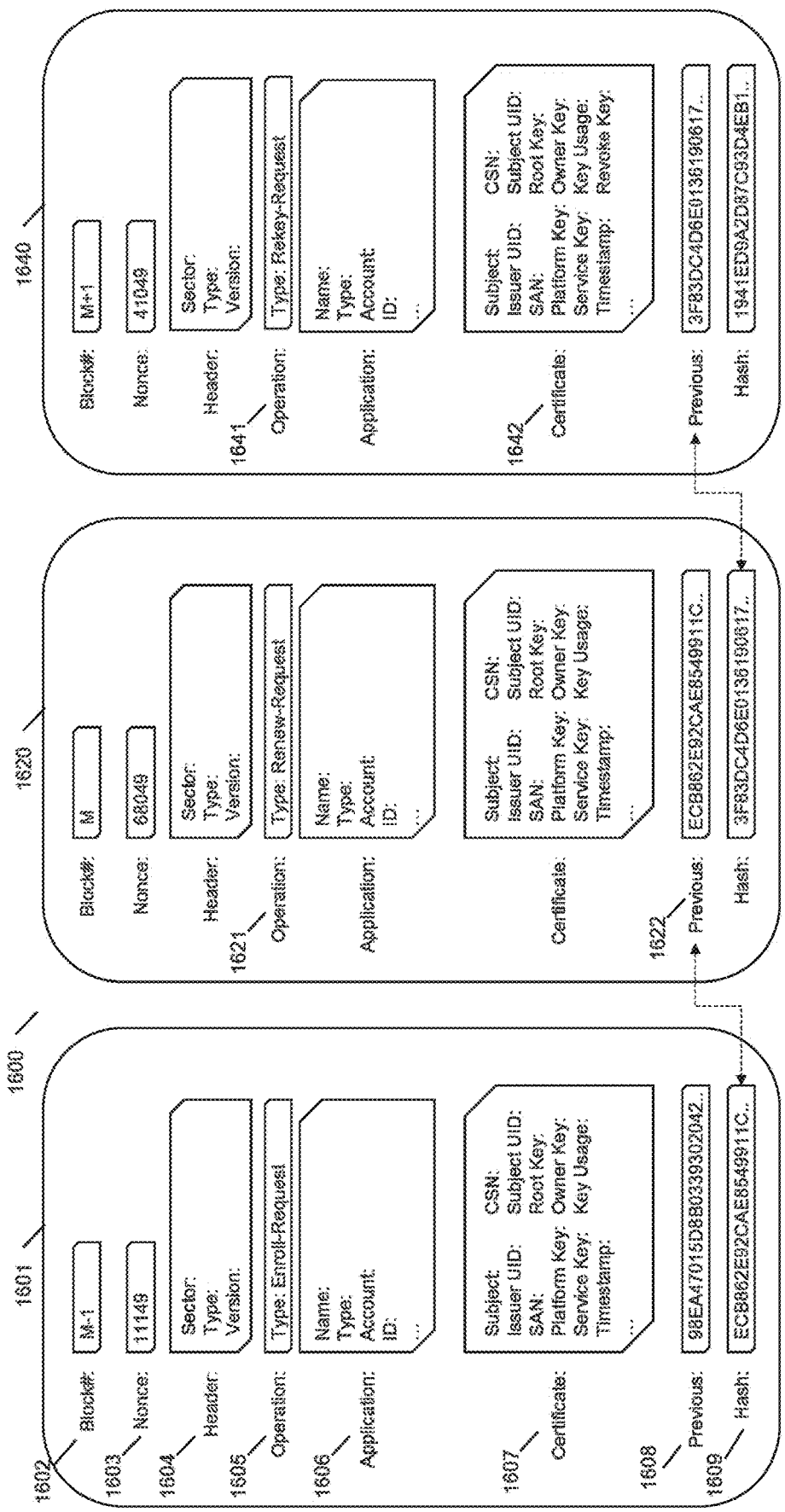
FIG. 16 is a schematic diagram illustrating a block schema to track an application trust chain on a device from a silicon fabrication plant, an original equipment manufacturer (OEM), a platform owner, to a device owner as a distributed ledger in a blockchain.

FIG. 16 describes a block schema to track an application trust chain on a device from a silicon fabrication plant, an original equipment manufacturer (OEM), a platform owner, to a device owner as a distributed ledger in a blockchain wherein remote enrollment service associated with the device and a transaction connector associated with the enrollment service submit transactions (equivalent to proof of work and proof of authorization) to a blockchain broker service node on a blockchain network.

Referring to FIG. 16, in block 1601, block #1602 represents a block sequence number in a blockchain and nonce 1603 is a random number based on requirements to hash a block in the blockchain. A header section 1604 comprises at least an industry sector, type of block data, and version of a block data format (or schema). An operation 1605 describes a type of operation (transaction) requested by the application (e.g., enroll, renew, rekey, revoke). An application section 1606 comprises at least an application name, an application type, an authentication account (credential or service account), and a unique identifier (ID) for the application. A certificate section 1607 comprises at least a subject name associated with a certificate, a certificate serial number (CSN), a unique identifier (UID) of an issuer of the certificate, a subject unique identifier, a subject alternate name (SAN) in the certificate, a root (public) key associated with the device (hardware, firmware or software based root of trust), a platform (public) key issued to the device, an owner (public) key associated with ownership of the device, a service (public) key associated with an application to access remote services (e.g., cloud services, peer-to-peer communications, etc.), an intended usage of the key (e.g., signing, encryption, . . . ), and a timestamp for date and time of the operation. Previous 1608 is a hash of a preceding block in the blockchain (not shown) and Hash 1609 is a hash of block 1601. In block 1620, Previous 1622 refers to Hash 1609 of block 1601 in the blockchain. In block 1640, a certificate 1642 includes a revoke key associated with a rekey operation 1641.

In one embodiment, the application key revocation may be performed as a revoke request operation type.

Figure 17:
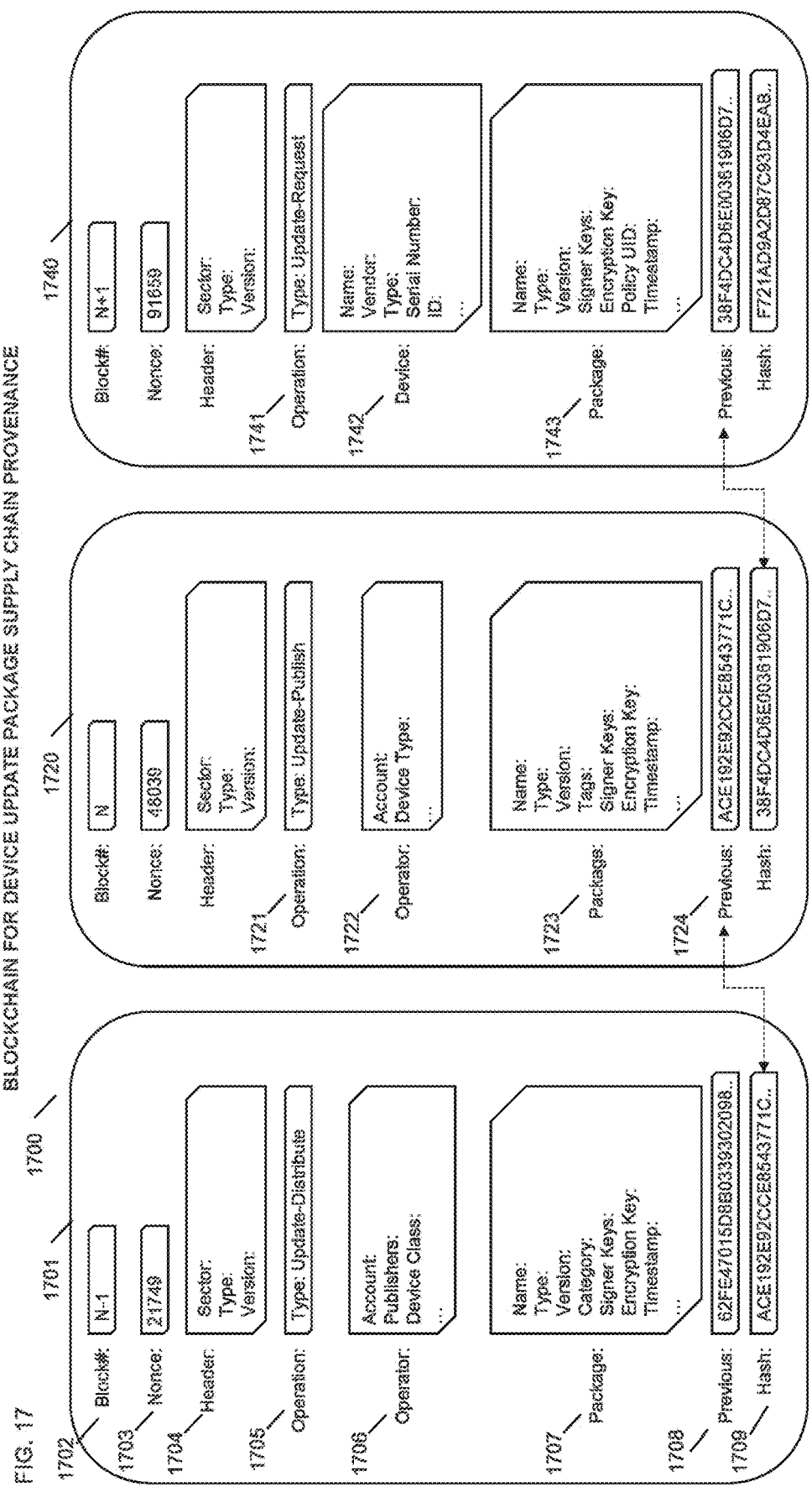
FIG. 17 is a schematic diagram illustrating a block schema to track change management for a device through a supply chain from a silicon fabrication plant, an original equipment manufacturer (OEM), a platform owner, to a device owner as a distributed ledger in a blockchain.

FIG. 17 describes a block schema to track change management for a device through a supply chain from a silicon fabrication plant, an original equipment manufacturer (OEM), a platform owner, to a device owner as a distributed ledger in a blockchain wherein a remote update service associated with the device and a transaction connector associated with an update service submit transactions (equivalent to proof of work and proof of authorization) to a blockchain broker service node on a blockchain network.

In one embodiment, a block of the blockchain identifies a provider identifier as an original content provider (source) in a supply chain and a publisher identifier as a remote update service (e.g., a device manager operated by the device owner or a managed services provider) in a supply chain, clearly differentiated from a common notion of a sender and receiver of messages (or content) that serves merely as a means to identify directly connected (point to point) entities in a transaction.

In one embodiment, the block of the blockchain comprises distributed and dynamic artifacts (explicit properties) associated with an operation rather than an unscalable method of device attributes preconfigured and implicitly inferred at a point of service for millions of IoT devices and further in a multi-tenant services configuration.

In one embodiment, a device historian may be built (instantiated) based on blocks in a blockchain wherein the blocks represent a plurality of distributed transactions submitted by a plurality of connected services in a supply chain of a plurality of providers associated with a connected device and hardware, firmware and software components of the device. Further, versioned blocks may be prepared for a specific industry sector, by operation type, and with the device, application or (portal or service) operator as an entity.

Referring to FIG. 17, in block 1701, block #1702 represents a block sequence number in a blockchain and nonce 1703 is a random number based on requirements to hash a block in the blockchain. A header section 1704 comprises at least an industry sector, type of block data, and version of a block data format (or schema). An operation 1705, 1721, 1741 describes a type of operation (transaction) associated with a device update package (e.g., distribute by a provider, publish by a publisher, request by a device). An operator section 1706 comprises at least a portal or service user account, list of publisher identifiers in a distribution (e.g., by public signing key or URL), and class of devices an update package is distributed for. A package section 1707 comprises at least an update package name, update package type, update package version, device category the update package is intended for, a list of signer public keys (e.g., providers and publisher in the supply chain), a device encryption public key, and a timestamp for date and time of the operation. Previous 1708 is a hash of a preceding block in the blockchain (not shown) and Hash 1709 is a hash of block 1701. In block 1720, Previous 1724 refers to Hash 1709 of block 1701 in the blockchain. An operator section 1722 includes a device type the update package is associated with and a package section 1723 includes tags associated by a publisher with the update package.

Figure 18:
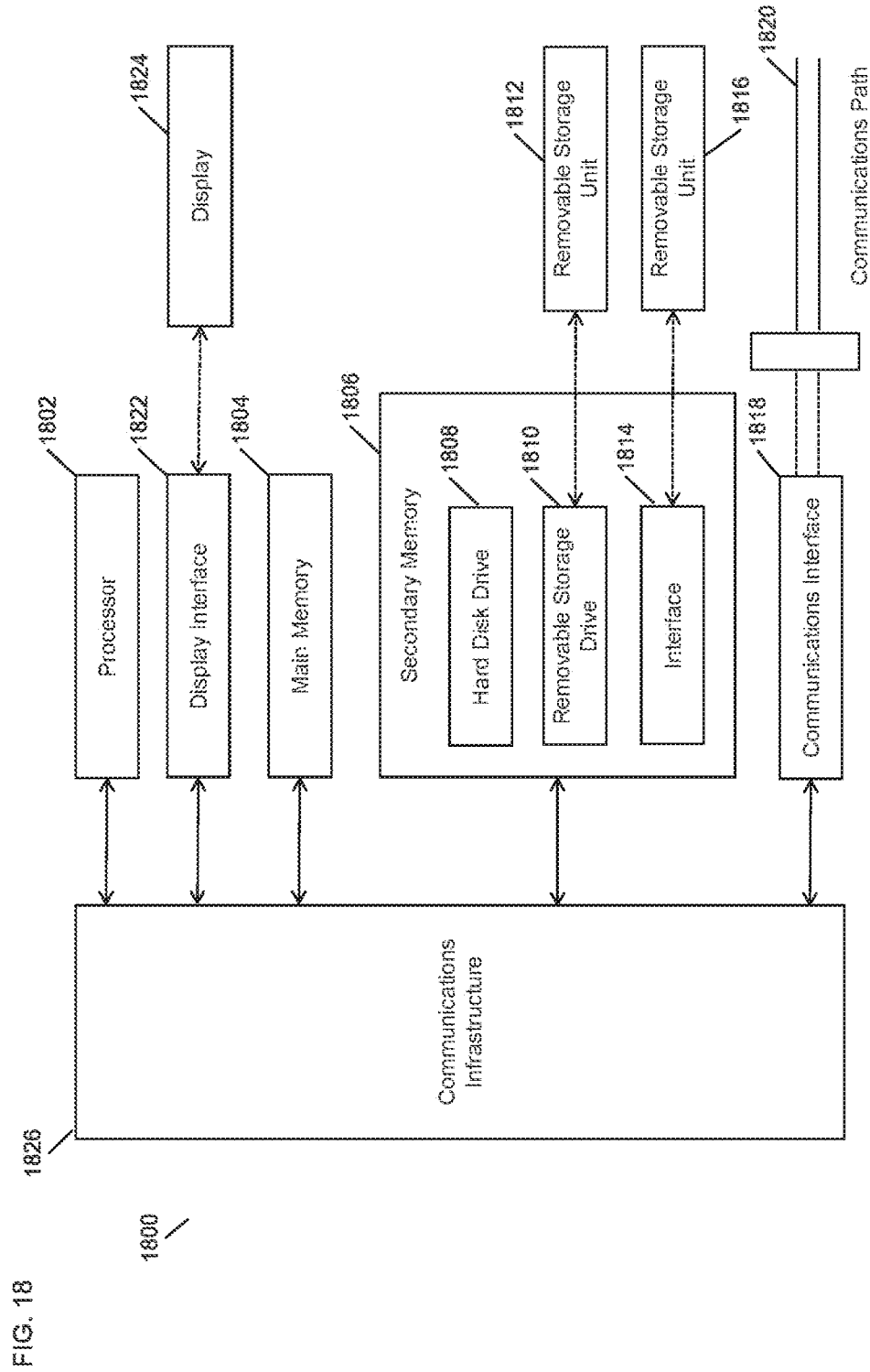
FIG. 18 is a diagram of an exemplary computer system in which embodiments of the method of device identification, discovery, enrollment and registration can be implemented.

FIG. 18 illustrates an exemplary computer system 1800 in which embodiments of the present disclosure, or portions thereof, may be implemented as computer-readable code. For example, the network systems and architectures disclosed here (the endpoint devices 101, gateway devices 102, enrollment service 103, database 311, update provider 601, update publisher 602, cloud service 1202, etc.) can be implemented in computer system 1800 using hardware, software, firmware, non-transitory computer readable media having instructions stored thereon, or a combination thereof and may be implemented in one or more computer systems or other processing systems. Hardware, software, or any combination of such may embody any of the modules and components used to implement the architectures and systems disclosed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the disclosure are described in terms of this example computer system 1800. After reading this description, it will become apparent to a person skilled in the relevant art how to implement the disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1802 may be a special purpose or a general-purpose processor device. As will be appreciated by persons skilled in the relevant art, processor device 1802 may also be a single processor in a multi-core/multiprocessor system, such system operating alone, or in a cluster of computing devices operating in a cluster or server farm. Processor device 1802 is connected to a communication infrastructure 1826, for example, a bus, message queue, network, or multi-core message-passing scheme.

The computer system 1800 also includes a main memory 1804, for example, random access memory (RAM) or flash memory, and may include a secondary memory 1806. Secondary memory 1806 may include, for example, a hard disk drive 1808, removable storage drive 1810. Removable storage drive 1810 may be a floppy disk drive, a magnetic tape drive, an optical disk drive, a flash memory, or the like.

The removable storage drive 1812 reads from and/or writes to a removable storage unit 1812 in a well-known manner. Removable storage unit 1812 may be a floppy disk, magnetic tape, optical disk, etc. which is read by and written to by removable storage drive 1810. As will be appreciated by persons skilled in the relevant art, removable storage unit 1812 includes a non-transitory computer usable storage medium having stored therein computer software and/or data.

In alternative implementations, secondary memory 1806 may include other similar means for allowing computer programs or other instructions to be loaded into computer system 1800. Such means may include, for example, a removable storage unit 1816 and an interface 1814. Examples of such means may include a program cartridge and cartridge interface (such as that found in video game devices), a removable memory chip (such as an EPROM, or PROM) and associated socket, and other removable storage units 1816 and interfaces 1814 which allow software and data to be transferred from the removable storage unit 1816 to computer system 1800.

The computer system 1800 may also include a communications interface 1818. Communications interface 1818 allows software and data to be transferred between computer system 1800 and external devices. Communications interface 1818 may include a modem, a network interface (such as an Ethernet card), a communications port, a PCMCIA slot and card, or the like. Software and data transferred via communications interface 1818 may be in the form of signals, which may be electronic, electromagnetic, optical, or other signals capable of being received by communications interface 1818. These signals may be provided to communications interface 1818 via a communications path 1820. Communications path 1820 carries signals and may be implemented using wire or cable, fiber optics, a phone line, a cellular phone link, an RF link or other communications channels.

The computer system 1800 may also include a computer display 1824 and a display interface 1822. According to embodiments, the display used to display the GUIs and dashboards shown in FIGS. 1-13 described above may be the computer display 1824, and the console interface may be display interface 1822.

In this document, the terms "computer program medium," "non-transitory computer readable medium," and "computer usable medium" are used to generally refer to media such as removable storage unit 1812, removable storage unit 1816, and a hard disk installed in hard disk drive 1808. Signals carried over communications path 1820 can also embody the logic described herein. Computer program medium and computer usable medium can also refer to memories, such as main memory 1804 and secondary memory 1806, which can be memory semiconductors (e.g., DRAMs, etc.). These computer program products are means for providing software to computer system 1800.

Computer programs (also called computer control logic) are stored in main memory 1804 and/or secondary memory 1806. Computer programs may also be received via communications interface 1818. Such computer programs, when executed, enable computer system 1800 to implement the present disclosure as discussed herein. In particular, the computer programs, when executed, enable processor device 1802 to implement the processes of the present disclosure, such as the stages in the methods illustrated by the flowcharts in FIGS. 1-13, discussed above. Accordingly, such computer programs represent controllers of the computer system 1800. Where the present disclosure is implemented using software, the software may be stored in a computer program product and loaded into computer system 1800 using removable storage drive 1812, interface 1814, and hard disk drive 1808, or communications interface 1818.

Embodiments of the disclosure also may be directed to computer program products comprising software stored on any computer useable medium. Such software, when executed in one or more data processing device, causes a data processing device(s) to operate as described herein. Embodiments of the disclosure employ any computer useable or readable medium. Examples of computer useable mediums include, but are not limited to, primary storage devices (e.g., any type of random access memory, etc.), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Although the present disclosure is illustrated and described herein with reference to specific embodiments, the disclosure is not intended to be limited to the details shown. Rather, various modifications may be made in the details within the scope and range equivalents of the claims and without departing from the disclosure.

What is claimed is:

1. A method comprising:
    generating, by a gateway device, a certificate request for an endpoint device, wherein the certificate request comprises information identifying the gateway device and information identifying the endpoint device;
    sending, by the gateway device to a certificate authority, the certificate request;
    receiving, by the gateway device, a certificate for the endpoint device for enrollment thereof, wherein the certificate is issued by the certificate authority;
    translating, by the gateway device, the certificate to generate a translated certificate for the endpoint device;
    facilitating, by the gateway device, one or more data communications between the endpoint device and a computing system, wherein facilitating the one or more data communications comprises providing the translated certificate to the computing system; and
    recording the enrollment for the endpoint device as a transaction record in a distributed ledger and distributing one or more blocks of the transaction record to one or more blockchain peers, wherein the distributed ledger contains a reproducible history of device and service transactions for the endpoint device, wherein the one or more blockchain peers include update package providers and publishers that are configured to provide update to the endpoint device which does not have and assigned Internet Protocol (IP) address and the gateway device does have an IP address.

2. The method of claim 1, wherein the gateway device implements an enrollment service.

3. The method of claim 1, further comprising configuring, by the gateway device, the endpoint device.

4. The method of claim 1, further comprising configuring, by the gateway device, the endpoint device independent of one or more user interactions.

5. The method of claim 1, further comprising configuring, by the gateway device, the endpoint device independent of one or more user parameters for registration of the endpoint device.

6. The method of claim 1, further comprising translating, by the gateway device, the certificate request to generate a translated certificate request, wherein sending, by the gateway device to the certificate authority, the certificate request comprises sending, by the gateway device to the certificate authority, the translated certificate request.

7. The method of claim 1, further comprising translating, by the gateway device, the certificate request based at least in part on the certificate authority to generate a translated certificate request, wherein sending, by the gateway device to the certificate authority, the certificate request comprises sending, by the gateway device to the certificate authority, the translated certificate request.

8. The method of claim 1, wherein translating, by the gateway device, the certificate to generate the translated certificate for the endpoint device comprises translating, by the gateway device, the certificate to generate the translated certificate associated with a second certificate authority.

9. The method of claim 1, further comprising requesting an update package for the endpoint device utilizing the translated certificate.

10. The method of claim 1, further comprising:
    requesting an update package for the endpoint device utilizing the translated certificate;
    obtaining the update package; and
    routing the update package to the endpoint device.

11. The method of claim 1, further comprising storing the translated certificate.

12. The method of claim 1, further comprising storing the translated certificate in a local data store.

13. The method of claim 1, further comprising:
    generating a certificate revocation request for the certificate; and
    routing the certificate revocation request to the certificate authority for disenrollment of the endpoint device.

14. The method of claim 1, further comprising obtaining a request for enrollment of the endpoint device, wherein generating the certificate request is based at least in part on the request for enrollment.

15. The method of claim 1, further comprising:
    obtaining a request for enrollment of the endpoint device, wherein generating the certificate request is based at least in part on the request for enrollment; and
    generating a request log, the request log indicating the request for enrollment of the endpoint device.

16. The method of claim 1, further comprising:
    obtaining a request for enrollment of the endpoint device, wherein generating the certificate request is based at least in part on the request for enrollment;
    generating a request log, the request log indicating the request for enrollment of the endpoint device; and
    recording the request log for the endpoint device as a transaction record in a distributed ledger.

17. Non-transitory computer-readable media including computer-executable instructions that, when executed by a computing system, cause the computing system to:
    generate a certificate request for an endpoint device, wherein the certificate request comprises information identifying the computing system and information identifying the endpoint device;
    send, to a certificate authority, the certificate request;

receive a certificate for the endpoint device for enrollment thereof, wherein the certificate is issued by the certificate authority;

translate certificate to generate a translated certificate for the endpoint device;

facilitate one or more data communications between the endpoint device and a computing system, wherein facilitating the one or more data communications comprises providing the translated certificate to the computing system; and cause recordation of the enrollment for the endpoint device as a transaction record in a distributed ledger and distributing one or more blocks of the transaction record to one or more blockchain peers, wherein the distributed ledger contains a reproducible history of device and service transactions for the endpoint device, wherein the one or more blockchain peers include update package providers are publishers that are configured to provide updates to the endpoint device which does not have an assigned Internet Protocol (IP) address and the gateway device does have an IP address.

18. A system comprising:

a data store; and one or more processors configured to:

generate a certificate request for an endpoint device, wherein the certificate request comprises information identifying the system and information identifying the endpoint device;

send, to a certificate authority, the certificate request;

receive a certificate for the endpoint device for enrollment thereof, wherein the certificate is issued by the certificate authority;

translate certificate to generate a translated certificate for the endpoint device;

facilitate one or more data communications between the endpoint device and a computing system, wherein facilitating the one or more data communications comprises providing the translated certificate to the computing system; and recordation of the enrollment for the endpoint device as a transaction record in a distributed ledger and distributing one or more blocks of the transaction record to one or more blockchain peers, wherein the distributed ledger contains a reproducible history of device and service transactions for the endpoint device, wherein the one or more blockchain peers include update package providers and publisher that are configured to provide updates to the endpoint device which does not have an assigned Internet Protocol (IP) address and the gateway device does have an IP address.

* * * * *